US010798330B2

(12) United States Patent
Matsuda

(10) Patent No.: US 10,798,330 B2
(45) Date of Patent: Oct. 6, 2020

(54) IMAGING DEVICE AND IMAGING APPARATUS

(71) Applicant: NIKON CORPORATION, Tokyo (JP)

(72) Inventor: Hideaki Matsuda, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 16/537,668

(22) Filed: Aug. 12, 2019

(65) Prior Publication Data

US 2019/0364236 A1 Nov. 28, 2019

Related U.S. Application Data

(63) Continuation of application No. 14/366,938, filed as application No. PCT/JP2012/008392 on Dec. 27, 2012, now Pat. No. 10,419,700.

(30) Foreign Application Priority Data

Dec. 27, 2011 (JP) .................................. 2011-286994
Dec. 28, 2011 (JP) .................................. 2011-288163

(51) Int. Cl.
*H04N 5/378* (2011.01)
*H04N 5/347* (2011.01)
*H04N 9/04* (2006.01)
*H04N 5/367* (2011.01)

(52) U.S. Cl.
CPC ............ *H04N 5/378* (2013.01); *H04N 5/347* (2013.01); *H04N 5/367* (2013.01); *H04N 9/045* (2013.01)

(58) Field of Classification Search
CPC ......... H04N 5/335; H04N 5/357; H04N 5/365
USPC ............... 250/208.1, 214 R, 214 A, 214 SW; 348/294, 300, 302, 303, 308
See application file for complete search history.

(56) References Cited

U.S. PATENT DOCUMENTS

| 5,949,483 A | 9/1999 | Fossum et al. |
| 7,515,183 B2 | 4/2009 | Yang et al. |
| 8,704,144 B2 | 4/2014 | Elliott et al. |
| 10,419,700 B2 * | 9/2019 | Matsuda ................ H04N 5/367 |
| 2005/0103977 A1 | 5/2005 | Krymski |
| 2005/0206752 A1 | 9/2005 | Lim |
| 2006/0243883 A1 | 11/2006 | Yahazu et al. |
| 2007/0297567 A1 | 12/2007 | Takenaka et al. |

(Continued)

FOREIGN PATENT DOCUMENTS

| CN | 101873443 A | 10/2010 |
| EP | 0 926 885 A2 | 6/1999 |

(Continued)

OTHER PUBLICATIONS

Sep. 8, 2015 Office Action issued in Japanese Patent Application No. 2013-551469.
Feb. 23, 2016 Office Action issued in Japanese Patent Application No. 2013-551469.
Jun. 16, 2016 Office Action issued in U.S. Appl. No. 14/366,938.
Jan. 5, 2017 Office Action issued in Chinese Patent Application No. 201280070719.1.

(Continued)

*Primary Examiner* — Kevin K Pyo
(74) *Attorney, Agent, or Firm* — Oliff PLC

(57) ABSTRACT

A solid state imaging device includes a pixel unit and an output unit. The pixel unit has a first pixel and a second pixel different from the first pixel. The output unit has a first capacitance to which a first pixel signal read from the first pixel is input, a second capacitance to which a second pixel signal read from the second pixel is input, and an operational amplifier outputting an output signal in accordance with the first capacitance and the second capacitance.

7 Claims, 26 Drawing Sheets

(56) References Cited

U.S. PATENT DOCUMENTS

| | | |
|---|---|---|
| 2009/0128678 A1 | 5/2009 | Kitami et al. |
| 2010/0271526 A1 | 10/2010 | Okuzaki et al. |
| 2011/0254592 A1 | 10/2011 | Keel et al. |

FOREIGN PATENT DOCUMENTS

| | | |
|---|---|---|
| JP | H08-182005 A | 7/1996 |
| JP | H11-196332 A | 7/1999 |
| JP | 2000-504516 A | 4/2000 |
| JP | 2005-269646 A | 9/2005 |
| JP | 2006-310933 A | 11/2006 |
| JP | 2007-515869 A | 6/2007 |
| JP | 2010-245951 A | 10/2010 |
| JP | 2010-263443 A | 11/2010 |
| JP | 2011-97646 A | 5/2011 |

OTHER PUBLICATIONS

Aug. 3, 2017 Office Action issued in U.S. Appl. No. 14/366,938.
Jun. 4, 2018 Office Action issued in U.S. Appl. No. 14/366,938.
Feb. 14, 2017 Office Action issued in U.S. Appl. No. 14/366,938.
Mar. 8, 2018 Office Action issued in U.S. Appl. No. 14/366,938.
Dec. 20, 2018 Office Action issued in U.S. Appl. No. 14/366,938.
Mar. 5, 2013 International Search Report issued in International Patent Application No. PCT/JP2012/008392.
Jul. 1, 2014 International Preliminary Report on Patentability issued in International Patent Application No. PCT/JP2012/008392.
Dec. 6, 2019 Office Action issued in Chinese Patent Application No. 201711057792.6.

\* cited by examiner $Vout = Vref - \{(C1+C2+C3)/Cf\} \times \Delta Vi$ $Vout = Vref - [\{(C1/Cf) \times \Delta Va\} + \{(C2/Cf) \times \Delta Vb\} + \{(C3/Cf) \times \Delta Vc\}]$
IN THE CASE OF
$C1 = C2 = C3 = C$
$Vout = Vref - \{(C/Cf) \times (\Delta Va + \Delta Vb + \Delta Vc)\}$

IMAGING DEVICE AND IMAGING APPARATUS

CROSS-REFERENCE TO RELATED APPLICATIONS

This is a Continuation of application Ser. No. 14/366,938 filed Aug. 26, 2014, which in turn is a U.S. National Stage application claiming the benefit of prior filed International Application Number PCT/JP2012/008392, filed Dec. 27, 2012, in which the International Application claims priorities from Japanese Application Numbers 2011-286994 (filed on Dec. 27, 2011) and 2011-288163 (filed on Dec. 28, 2011), the entire contents of which are incorporated herein by reference.

TECHNICAL FIELD

The present application relates to a solid state imaging device and an imaging apparatus.

BACKGROUND ART

Conventionally, a solid state imaging device has been proposed which performs reading by thinning pixels in the vertical direction and in the horizontal direction in motion image shooting in order to obtain an image in which the number of pixels is reduced than the number of imaging device pixels at the time of motion image (refer to, for example, Patent Document 1).

PATENT DOCUMENT

Patent Document 1: Japanese Unexamined Patent Application Publication No. H11-196332

DISCLOSURE

Problems to be Solved

However, the conventional solid state imaging device performs reading by thinning pixels in the horizontal direction, and therefore, moire and false color easily occur in the horizontal direction.

In contrast to this, by adding pixel signals in the horizontal direction instead of thinning pixels in the horizontal direction, moire and false color are hard to occur in the horizontal direction. Not limited to this, there may also be a case where it is required to add pixel signals in the horizontal direction for various reasons.

Consequently, it is considered to mount an addition circuit performing addition of pixel signals in the horizontal direction on the solid state imaging device. However, if a dedicated addition circuit performing addition of pixel signals in the horizontal direction is provided, trouble occurs, such as an increase in the installation space.

Means for Solving the Problems

A solid state imaging device of an aspect of the present embodiment includes a pixel unit and an output unit. The pixel unit has a first pixel and a second pixel different from the first pixel. The output unit has a first capacitance to which a first pixel signal read from the first pixel is input, a second capacitance to which a second pixel signal read from the second pixel is input, and an operational amplifier outputting an output signal in accordance with the first capacitance and the second capacitance.

A solid state imaging device of another aspect of the present embodiment includes a pixel unit, a first output unit, a second output unit, and a controlling unit. The pixel unit has a first pixel and a second pixel different from the first pixel. The first output unit has a first capacitance, a second capacitance, and a first operational amplifier outputting a first output signal in accordance with the first capacitance and the second capacitance. The second output unit has a third capacitance, a fourth capacitance, and a second operational amplifier outputting a second output signal in accordance with the third capacitance and the fourth capacitance. The controlling unit switches between a first mode and a second mode. In the first mode, a first pixel signal read from the first pixel is input to the first capacitance and a second pixel signal read from the second pixel is input to the second capacitance. In the second mode, the first pixel signal is input to the first capacitance and the second capacitance and the second pixel signal is input to the third capacitance and the fourth capacitance.

DETAILED DESCRIPTION OF THE EMBODIMENTS

Hereinafter, with reference to drawings, a solid state imaging device and an imaging apparatus according to the present invention will be described.

First Embodiment

Figure 1:
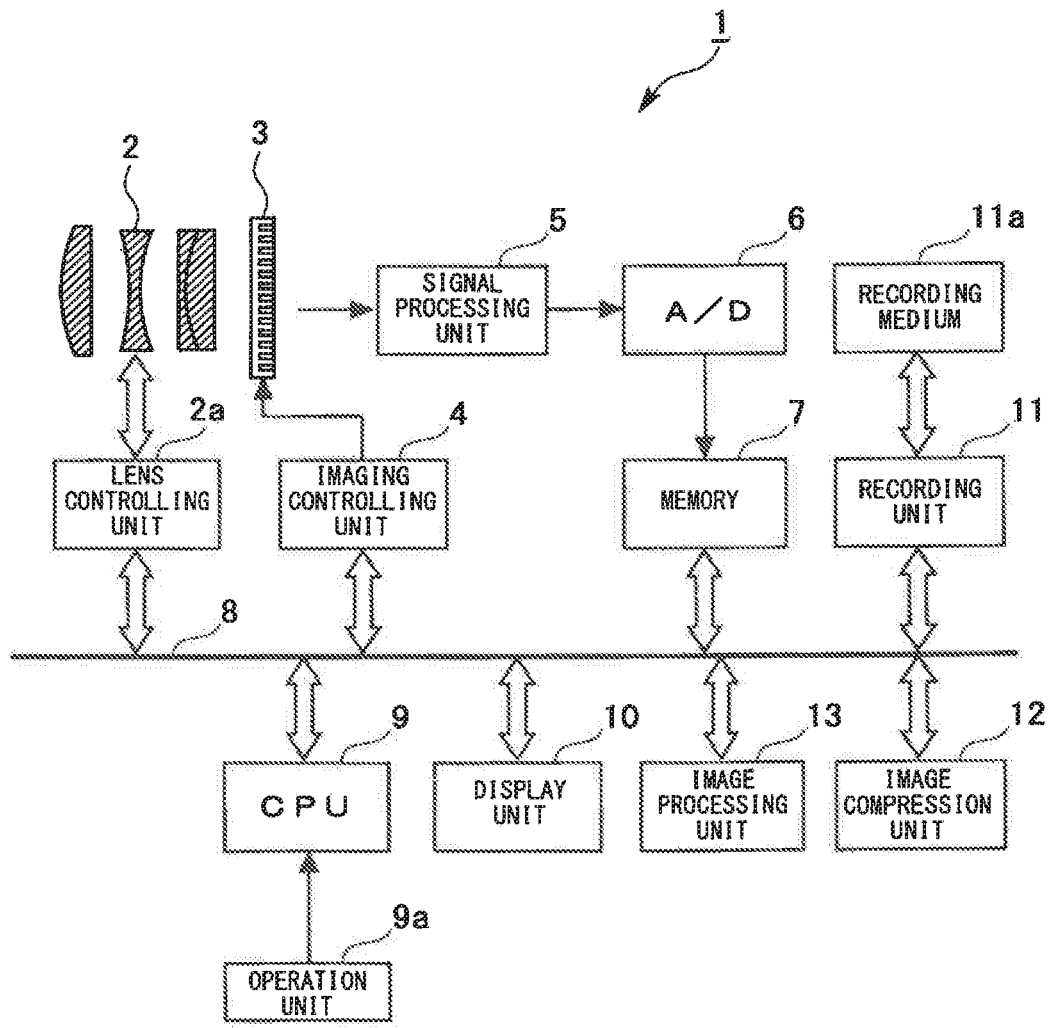
FIG. 1 is an outline block diagram schematically illustrating an electronic camera according to a first embodiment.

FIG. 1 is an outline block diagram schematically illustrating an electronic camera 1 as an imaging apparatus according to a first embodiment.

The electronic camera 1 according to the present embodiment is configured as, for example, a single-lens reflex digital camera. However, not limited to this, it is possible to apply the imaging apparatus according to the present invention to various imaging apparatuses, such as another electronic camera such as a compact camera, an electronic camera mounted on a mobile telephone, and a film camera.

To the electronic camera 1, a shooting lens 2 is attached. A focus and a diaphragm of the shooting lens 2 are driven by a lens controlling unit 2a. In an image space of the shooting lens 2, an imaging surface of a solid state imaging device 3 is arranged.

The solid state imaging device 3 is driven by instructions of an imaging controlling unit 4 to output an image signal. In the electronic viewfinder mode or in the motion image shooting, the imaging controlling unit 4 controls the solid state imaging device 3 so as to perform a horizontal pixel addition read operation, to be described later, while performing, for example, a so-called rolling electronic shutter. Further, at the time of normal actual shooting (at the time of still image shooting) etc., the imaging controlling unit 4 controls the solid state imaging device 3 so as to obtain image signals of all the pixels without horizontal pixel addition after, for example, exposure by a mechanical shutter, not shown, after a so-called global reset to reset all the pixels at the same time. Each image signal is subjected to A/D conversion by an A/D conversion unit 6 and temporarily accumulated in a memory 7 after being subjected to signal processing, such as black level clamp processing, by a signal processing unit 5. The memory 7 is connected to a bus 8. To the bus 8, the lens controlling unit 2a, the imaging controlling unit 4, a CPU 9, a display unit 10, such as a liquid crystal display panel, a recording unit 11, an image compression unit 12, an image processing unit 13, etc., are connected. To the CPU 9, an operation unit 9a, such as a release button, is connected. To the recording unit 11, a recording medium 11a is attached in an attachable/detachable manner.

When the electronic viewfinder mode or motion image shooting is instructed by the operation of the operation unit 9a, the CPU 9 within the electronic camera 1 drives the imaging controlling unit 4 in accordance therewith. The imaging controlling unit 4 controls the solid state imaging device 3 so as to perform the horizontal pixel addition read operation, to be described later, while performing, for example, the rolling electronic shutter. At this time, the focus and diaphragm are adjusted appropriately by the lens controlling unit 2a. The image signal subjected to horizontal pixel addition obtained from the solid state imaging device 3 is accumulated in the memory 7. The CPU 9 causes the display unit 10 to display the image of the image signal subjected to horizontal pixel addition in the electronic viewfinder mode and records the image signal subjected to horizontal pixel addition in the recording medium 11a in the motion image shooting. At the time of normal actual shooting (at the time of still image shooting) etc., after the image signal not subjected to horizontal pixel addition is accumulated in the memory 7, the CPU 9 performs desired processing in the image processing unit 13 or in the image compression unit 12 in accordance with necessity based on the instructions of the operation unit 9a and causes the recording unit 11 to output the signal after the processing and records the signal in the recording medium 11a.

Figure 2:
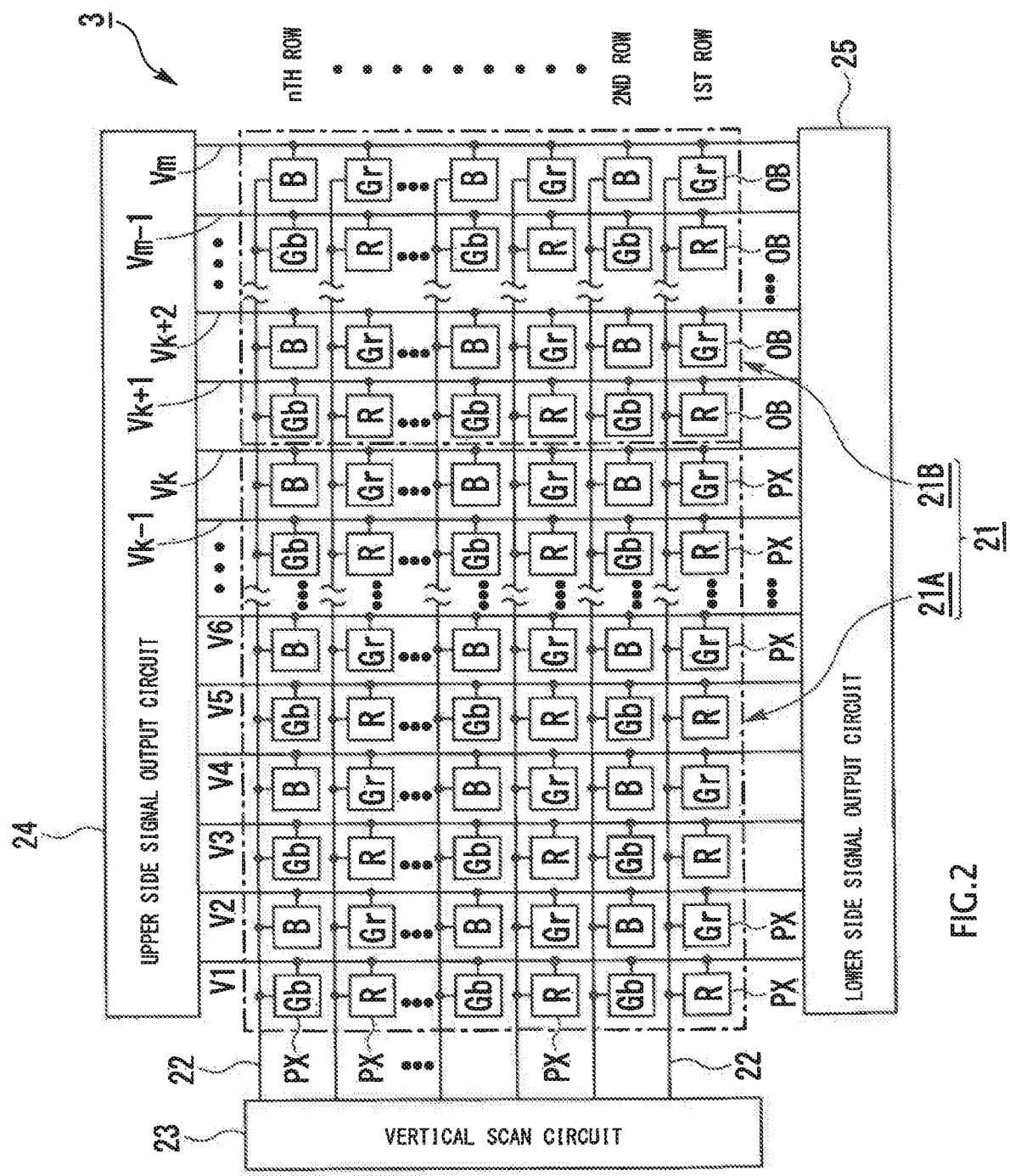
FIG. 2 is a circuit diagram illustrating an outline configuration of a solid state imaging device in FIG. 1.

FIG. 2 is a circuit diagram illustrating an outline configuration of the solid state imaging device 3 in FIG. 1. In the present embodiment, the solid state imaging device 3 is configured as a CMOS-type solid state imaging device, but may be configured as another XY address-type solid state imaging device.

As illustrated in FIG. 2, the solid state imaging device 3 has a pixel unit 21, a plurality of horizontal control signal lines 22, a vertical scan circuit 23, a plurality of vertical signal lines V1 to Vm, and an upper side signal output circuit 24 and a lower side signal output circuit 25 arranged on both sides in the column direction (vertical direction, up and down direction in FIG. 2) of the pixel unit 21, respectively.

The pixel unit 21 has an effective pixel unit 21A including effective pixels PX arranged in a two-dimensional matrix of n rows and k columns and outputting image signals in accordance with incident light and an OB pixel unit 21B including optical black pixels (OB pixels) OB arranged in a two-dimensional matrix of n rows and (m-k) columns and generating signals at the black level. In the present embodiment, the OB pixel unit 21B is arranged on the right side in FIG. 2 in the row direction (horizontal direction, right and left direction in FIG. 2) of the region of the effective pixel unit 21A. However, the OB pixel unit 21B may be arranged on the left side in FIG. 2 of the effective pixel unit 21A or may be arranged on both right and left sides in FIG. 2, i.e., of the effective pixel unit 21A.

In each row of the pixel unit 21, each of the horizontal control signal lines 22 connected to the vertical scan circuit 23 is arranged. Each of the horizontal control signal lines 22 supplies control signals (control signals φSEL, φRES, φTX, to be described later) output from the vertical scan circuit 23 to each row of the pixels PX and OB.

Each of the plurality of vertical signal lines V1 to Vk is provided for each column of the effective pixel PX and receives a signal from the effective pixel PX of the corresponding column. Each of the plurality of vertical signal lines Vk+1 to Vm is provided for each column of the OB pixel OB and receives a signal from the OB pixel OB of the corresponding column. The vertical signal lines Vk+1 to Vm are OB pixel vertical signal lines. The top ends of the vertical signal lines V1 to Vm (to be strict, in the present embodiment, the top ends of the vertical signal lines of even-numbered columns of those vertical signal lines) are connected to the upper side signal output circuit 24. The bottom ends of the vertical signal lines V1 to Vm (to be strict, in the present embodiment, the lower ends of the vertical signal lines of odd-numbered columns of those vertical signal lines) are connected to the lower side signal output circuit 25. Here, symbol V1 is attached to the vertical signal line of the first column, symbol Vm is attached to the vertical signal line of the mth column, and this also applies to other vertical signal lines. To each of the vertical signal lines V1 to Vm, a constant current source 26 is connected (refer to FIG. 5 and FIG. 6, to be described later). It may also be possible to connect the constant current source 26 to the top end side and the bottom end side of each of the vertical signal lines V1 to Vm, thereby connecting the two constant current sources 26 to each of the vertical signal lines V1 to Vm. In this case, the current value of one constant current source is set to a value half the current value necessary for one vertical signal line.

Figure 4:
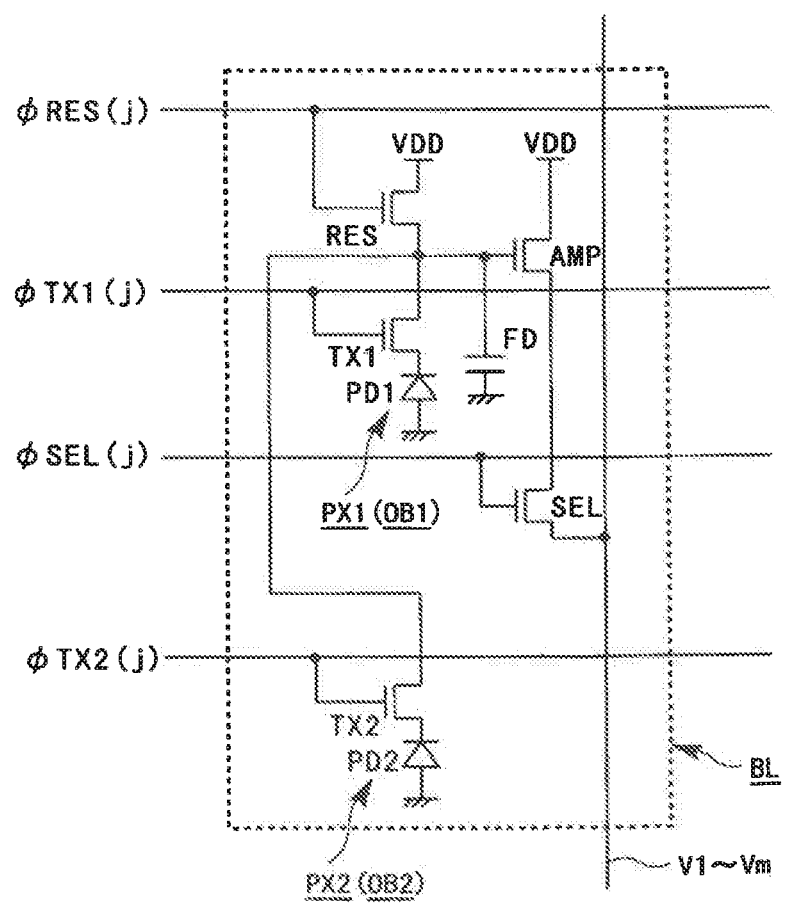
FIG. 4 is a circuit diagram illustrating a pixel in a modification example.
Figure 5:
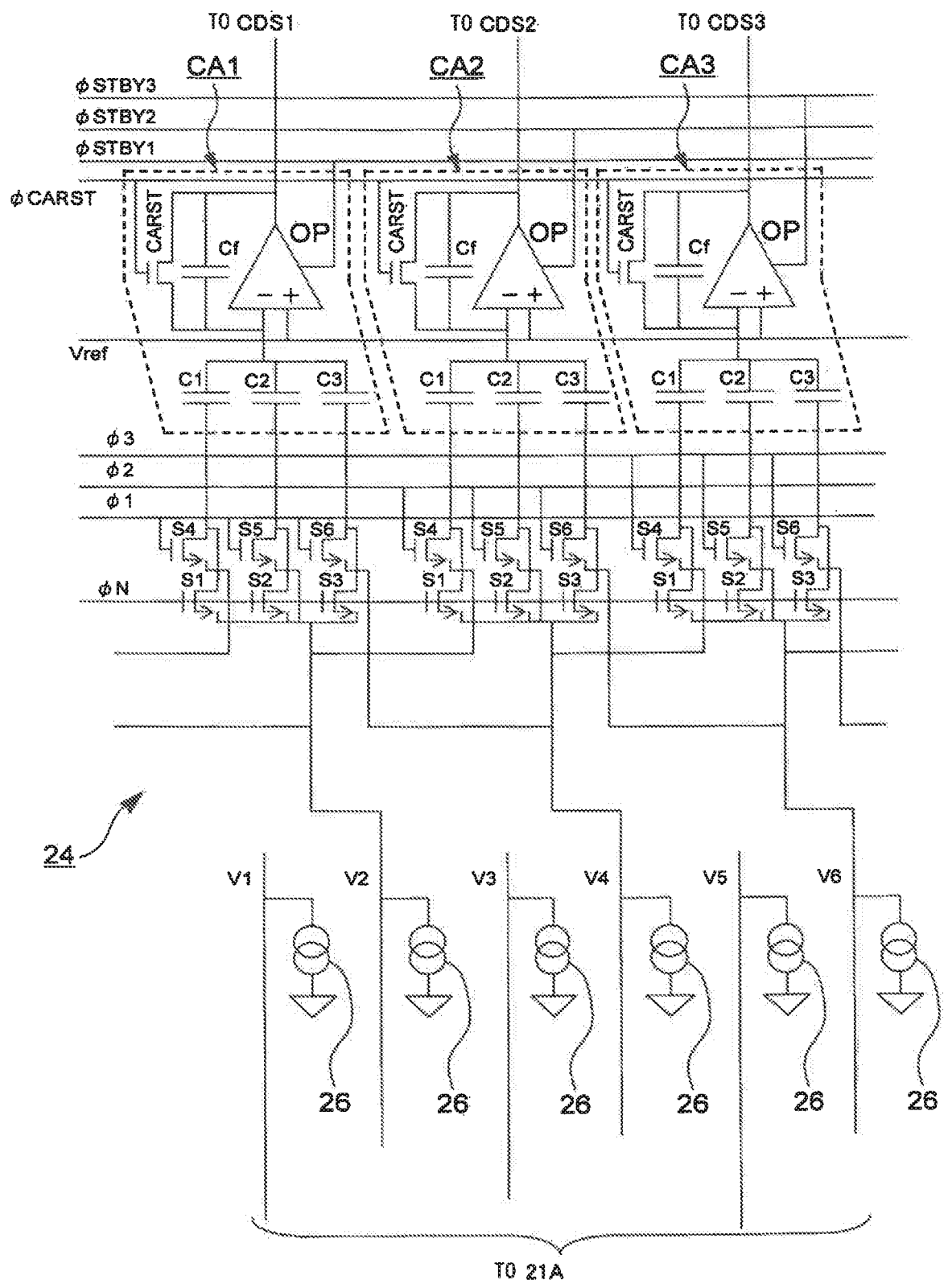
FIG. 5 is a circuit diagram illustrating a portion of an upper side signal output circuit in FIG. 2.

In accordance with necessity, it may also be possible to provide a clip circuit such as disclosed, for example, in FIG. 4 and FIG. 5 of Japanese Unexamined Patent Application Publication No. 2010-263443 for each of the vertical signal lines V1 to Vm in order to prevent so-called the horizontal smear and the black sun.

In the present embodiment, on the light incidence side of each pixel PX, a plurality of kinds of color filters each transmitting light of a different color component is arranged in a color arrangement having a repetition period of 2 rows and 2 columns. The pixel PX outputs an electric signal corresponding to each color by color separation in the color filter. In the present embodiment, as illustrated in FIG. 2, as the above-described color arrangement, a Bayer arrangement is adopted and color filters of red (R), green (Gr, Gb), and blue (B) are arranged in each pixel PX in accordance with the Bayer arrangement. In other words, in the odd-numbered rows of the effective pixel unit 21A, the color filters of R and Gr are put side by side alternately and in the even-numbered rows of the effective pixel unit 21A, the filters of Gb and B are put side by side alternately. Then, in the effective pixel unit 21A as a whole, the green filters are arranged so as to form a checkered pattern. Thereby, it is possible for the effective pixel unit 21A to acquire a color image at the time of imaging. In the present embodiment, in the OB pixel unit 21B also, as in the effective pixel unit 21A, color filters are arranged. However, the OB pixel OB outputs a black level, and therefore, it is not necessarily required to arrange color filters in the OB pixel unit 21B. In FIG. 2, in each of the pixels PX and OB, the color of the color filter is also indicated.

Figure 3:
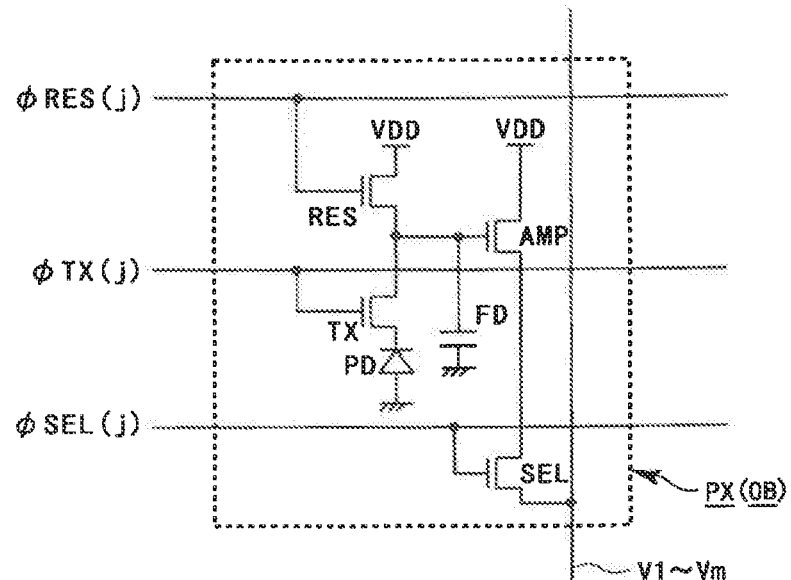
FIG. 3 is a circuit diagram illustrating a pixel in FIG. 2.

FIG. 3 is a circuit diagram illustrating the pixel PX or OB in FIG. 2. In the present embodiment, each pixel PX has, like the pixel of a general CMOS-type solid state imaging device, a photodiode PD as a photoelectric conversion unit, a floating diffusion FD as a charge/voltage conversion unit receiving charges and converting the above-described charges into a voltage, a reset transistor RES resetting the potential of the floating diffusion FD, a selection transistor SEL supplying a signal in accordance with the potential of the floating diffusion FD to the vertical signal lines V1 to Vm, a transfer transistor TX as a charge transfer unit transferring charges from the photodiode PD to the floating diffusion FD, and an amplification transistor AMP as an amplification unit outputting the above-described signal in accordance with the potential of the floating diffusion FD, and these are connected as illustrated in FIG. 3. In FIG. 3, VDD denotes a power source potential. In the present embodiment, the transistors AMP, TX, RES, and SEL of the pixels PX and OB are all nMOS transistors.

In the present embodiment, the OB pixel OB has the same structure as that of the effective pixel PX except in that light to the photodiode PD is blocked. However, the OB pixel OB may have, for example, the structure of the effective pixel PX from which the photodiode PD is removed.

The gates of the transfer transistors TX are connected in common for each row and the control signal φTX controlling the transfer transistor TX is supplied thereto from the vertical scan circuit 23. The gates of the reset transistors RES are connected in common for each row and the control signal φRES controlling the reset transistor RES is supplied thereto from the vertical scan circuit 23. The gates of the selection transistors SEL are connected in common for each row and the control signal φSEL controlling the selection transistor SEL is supplied thereto from the vertical scan circuit 23. When each control signal φTX is discriminated for each row, the control signal φTX of the j-th row is denoted by symbol φTX(j). This also applies to the control signals φRES and φSEL.

The photodiode PD of each pixel PX generates signal charges in accordance with the amount of incident light (subject light). The transfer transistor TX turns on during the high-level period of the control signal φTX and transfers charges of the photodiode PD to the floating diffusion FD. The reset transistor RES turns on during the high-level period of the control signal φRES (period of the power source potential VDD) and resets the floating diffusion FD.

The drain of the amplification transistor AMP is connected to the power source potential VDD, the gate thereof is connected to the floating diffusion FD, and the source thereof is connected to the drain of the selection transistor SEL, thereby configuring a source follower circuit with the constant current source 26 (not shown in FIG. 3, refer to FIG. 5 and FIG. 6) as a load. The amplification transistor AMP outputs read signals to the vertical signal lines V1 to Vm via the selection transistor SEL in accordance with the voltage value of the floating diffusion FD. The selection transistor SEL turns on during the high-level period of the control signal ϕSEL and connects the source of the amplification transistor AMP to the vertical signal lines V1 to Vm.

The vertical scan circuit 23 in FIG. 2 receives the control signal from the imaging controlling unit 4 in FIG. 1, outputs the control signals ϕSEL, ϕRES, and ϕTX, respectively, for each row of the pixels PX and OB and realizes the operation by the rolling electronic shutter, the still image read operation by the global reset utilizing a mechanical shutter, etc. Those specific operations are publicly known, and therefore, explanation thereof is omitted here.

The configuration of the pixel PX, OB is not limited to the configuration illustrated in FIG. 3 described previously. For example, as the configuration of the pixel PX, OB, the configuration illustrated in FIG. 4 may be adopted. FIG. 4 is a circuit diagram illustrating the pixel PX, OB according to a modification example. In FIG. 4, the same symbol is attached to the component the same as or corresponding to the component in FIG. 3 and duplicated explanation thereof is omitted.

The configuration illustrated in FIG. 4 differs from the configuration illustrated in FIG. 3 in that for each two pixels PX, OB adjacent to each other in the column direction, the two pixels PX and OB share one set of the floating diffusion FD, the amplification transistor AMP, the reset transistor RES, and the selection transistor SEL. In this modification example, the vertical scan circuit 23 is configured to output the control signals ϕSEL, ϕRES, ϕTX1 and ϕTX2 as illustrated in FIG. 4 in place of the control signals ϕSEL, ϕRES, and ϕTX as illustrated in FIG. 3.

In FIG. 4, the two pixels PX, OB sharing one set of the floating diffusion FD, the amplification transistor AMP, the reset transistor RES, and the selection transistor SEL are illustrated as a pixel block BL. In FIG. 3, the photodiode PD and the transfer transistor TX of the pixels PX, OB on the upper side within the pixel block BL are denoted by symbols PD1 and TX1, respectively, and the photodiode PD and the transfer transistor TX of the pixels PX, OB on the lower side within the pixel block BL are denoted by symbols PD2 and TX2, respectively, thereby discriminating both. Further, the control signal supplied to the gate of the transfer transistor TX1 is denoted by ϕTX1 and the control signal supplied to the gate electrode of the transfer transistor TX2 is denoted by ϕTX2, thereby discriminating both. In FIG. 4, j denotes the pixel row, but in FIG. 4, j denotes the row of the pixel block BL. One row of the pixel block BL corresponds to two rows of the pixels PX, OB.

In this modification example, it is possible for the vertical scan circuit 23 to realize the operation by the rolling electronic shutter, the still image read operation by the global reset utilizing a mechanical shutter, etc., by receiving the control signal from the imaging controlling unit 4 in FIG. 1 and outputting the control signals ϕSEL, ϕRES, ϕTX1, and ϕTX2, respectively, for each row of the pixels PX, OB.

FIG. 5 is a circuit diagram illustrating one portion of the upper side signal output circuit 24 in FIG. 2 (three switch groups (each switch group includes switches S1 to S6) and three amplification units CA1 to CA3 provided in correspondence to the vertical signal lines V2, V4, and V6, respectively, of the second column, the fourth column, and the sixth column of the effective pixel units 21A).

Figure 6:
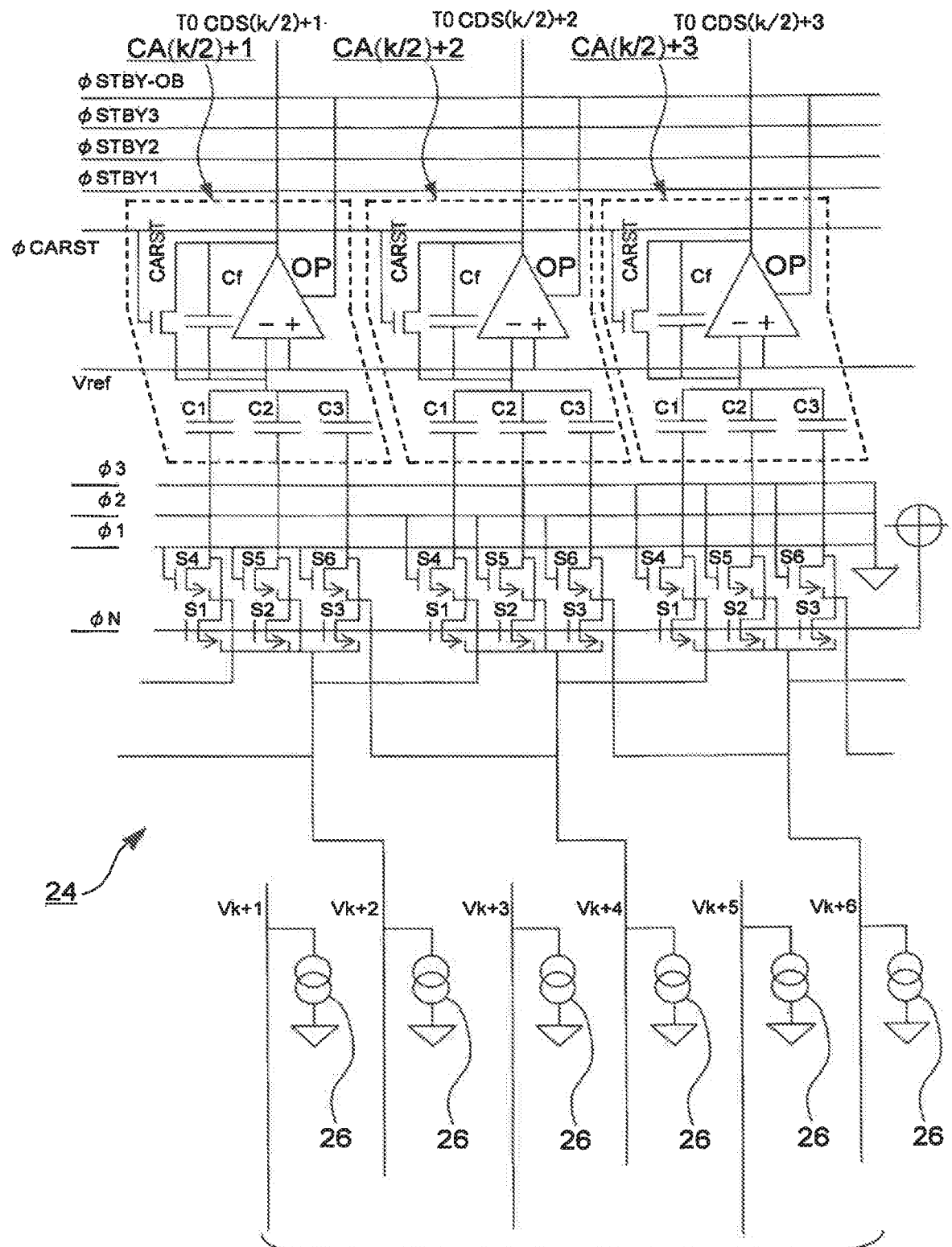
FIG. 6 is a circuit diagram illustrating another portion of the upper side signal output circuit in FIG. 2.

FIG. 6 is a circuit diagram illustrating another portion of the upper side signal output circuit 24 in FIG. 2 (three switch groups (each switch group includes the switches S1 to S6) and three amplification units CA(k/2)+1, CA(k/2)+2, and CA(k/2)+3 provided in correspondence to the (k+2)-th column, the (k+4)-th column, and the (k+6)-th column, respectively, of the OB pixel unit 21B). In FIG. 6, the same symbol is attached to the component the same as or corresponding to the component in FIG. 5.

Figure 7:
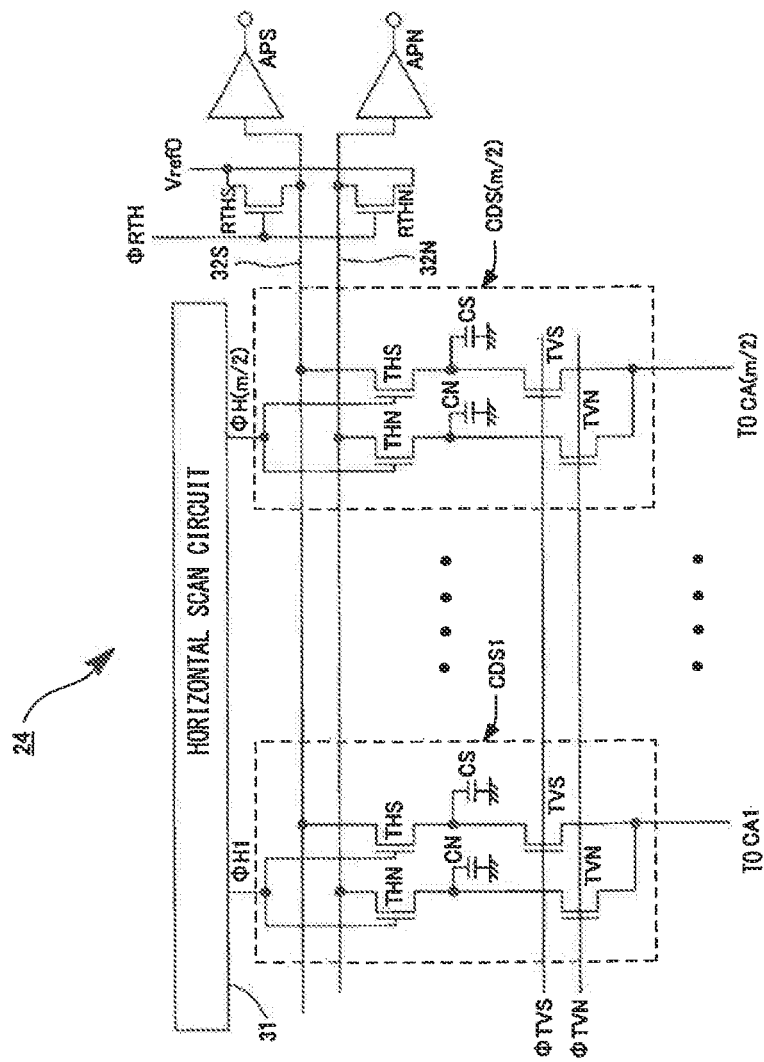
FIG. 7 is a circuit diagram illustrating still another portion of the upper side signal output circuit in FIG. 2.

FIG. 7 is a circuit diagram illustrating still another portion of the upper side signal output circuit 24 (sampling units CDS1 to CDS(m/2) each sampling and holding output signals of k/2 amplification units CA1 to CA(k/2) provided in correspondence to the vertical signal lines, respectively, of the even-numbered columns from the second column to the k-th column of the effective pixel unit 21A and output signals of (m−k)/2 amplification units CA(k/2)+1 to CA(m/2) provided in correspondence to the vertical signal lines, respectively, of the even-numbered columns from the (k+2)-th column to the m-th column of the OB pixel unit 21B, a horizontal scan circuit 31, etc.).

In the present embodiment, as partially illustrated in FIG. 5, the upper side signal output circuit 24 has k/2 switch groups each including the switches S1 to S6 and the k/2 amplification units CA1 to CA(k/2) provided in correspondence to the vertical signal lines V2, V4, . . . , Vk, respectively, of the even-numbered columns of the effective pixel unit 21A.

Each of the amplification units CA1 to CA(k/2) has the same configuration and has p (in the present embodiment, three) input capacitances C1 to C3, an operational amplifier OP, a feedback capacitance Cf, and a column amplifier reset switch CARST resetting a column amplifier in accordance with a column amplifier reset signal ΦCARST. To an inverting input pin (first input pin) of the operational amplifier OP, the end part on one side of each of the input capacitances C1 to C3 is connected. Between the inverting input pin of the operational amplifier OP and the output pin of the operational amplifier OP, the feedback capacitance Cf and the column amplifier reset switch CARST are connected in parallel. To a non-inverting input pin (second input pin) of the operational amplifier OP, a predetermined potential Vref is applied. The column amplifier reset switch CARST includes a MOS transistor and turns on when the column amplifier reset signal ΦCARST is at the high level and on the other hand, turns off when the column amplifier reset signal ΦCARST is at the low level. The gates of the column amplifier reset switches CARST of the respective amplification units CA1 to CA(k/2) is connected in common and the column amplifier reset signal ΦCARST is supplied thereto from the imaging controlling unit 4.

In the present embodiment, as the operational amplifier OP, an operational amplifier (hereinafter, called an "operational amplifier with standby function") is used, which is capable of taking an operating state and an operation suspended state where power consumption is low compared to that of the above-described operating state in accordance with an operation control signal ϕSTBY. In accordance with the operating state and the operation suspended state of the operational amplifier OP, the amplification unit having the operational amplifier OP takes the operating state and the operation suspended state as a whole.

Figure 8:
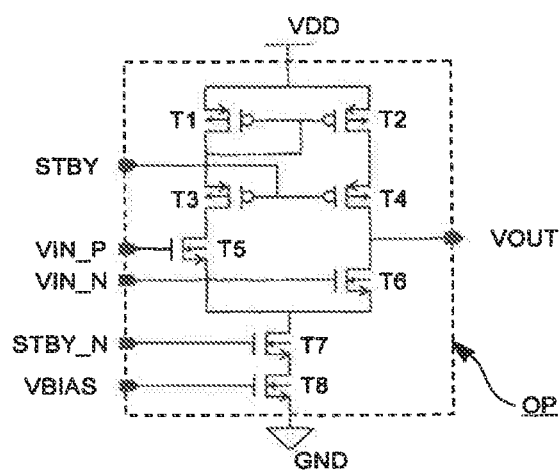
FIG. 8 is a circuit diagram illustrating a specific example of an operational amplifier configuring an amplification unit in FIG. 5.

FIG. 8 is a circuit diagram illustrating a specific example of the operational amplifier OP, which is an operational amplifier with standby function. In this example, the operational amplifier OP includes pMOS transistors T1 to T4 and nMOS transistors T5 to T8. In this example, to the transistors T1, T2, T5, T6, and T8 that form a general configuration of the operational amplifier, the transistors T3, T4, and T7 are added, thereby realizing the standby function. In FIG. 8, VIN_P, VIN_N, and VOUT denote the non-inverting input pin, the inverting input pin, and the output pin, respectively, of the operational amplifier OP. VBIAS denotes a bias voltage input pin to which a current source bias voltage from a bias circuit, not illustrated, is applied.

In FIG. 8, STBY denotes a pin (operation control signal input pin) to which the operation control signal φSTBY is input and STBY_N denotes a pin to which an inverted signal of the operation control signal φSTBY is input. When the operation control signal φSTBY becomes the high level, the transistors T3, T4, and T7 turn off and the current flowing through the operational amplifier OP is blocked to bring the operational amplifier OP into the operation suspended state, and the output pin VOUT becomes floating. In FIG. 5 etc., description is given on the assumption that only operation control signals φSTBY1 to φSTBY3 corresponding to the operation control signal φSTBY are supplied to the operational amplifier OP and control lines etc. through which the inverting operation control signals corresponding to the operation control signal φSTBY_N are supplied to the operational amplifier OP are not illustrated. In the following explanation, only the operation control signal φSTBY is referred to and the reference to the inverting operation control signal is omitted.

When the amplification units CA1 to CA(k/2) are divided into p (in the present embodiment, three) groups in which the corresponding vertical signal lines have a period of p×2 (in the present embodiment, p=3, therefore, six), in other words, when the amplification units CA1 to CA(k/2) are divided into a first group of the amplification units CA1, CA4, CA7, . . . , a second group of the amplification units CA2, CA5, CA8, . . . , and a third group of the amplification units CA3, CA6, CA9, . . . , the operation control signal φSTBY is input for each group. That is, operation suspending signal input pins of the amplification units CA1, CA4, CA7, . . . of the first group are connected in common and the operation control signal φSTBY1 is supplied thereto from the imaging controlling unit 4. The operation suspending signal input pins of the amplification units CA2, CA5, CA8, . . . of the second group are connected in common and the operation control signal φSTBY2 is supplied thereto from the imaging controlling unit 4. The operation suspending signal input pins of the amplification units CA3, CA6, CA9, . . . of the third group are connected in common and the operation control signal φSTBY3 is supplied thereto from the imaging controlling unit 4.

The switches S1 to S6 of each group of the above-described k/2 switch groups include nMOS transistors. The switch S5 of each group of the above-described k/2 switch groups turns on and off the portion between the other end part of the input capacitance C2 of the amplification unit provided in correspondence to the same vertical signal line as that of the switch group and the vertical signal line. For example, the switch S5 of the switch group corresponding to the vertical signal line V4 turns on and off the portion between the other end part of the input capacitance C2 of the amplification unit CA2 provided in correspondence to the same vertical signal line V4 as that of the switch group and the vertical signal line V4.

The switch S4 of each group of the above-described k/2 switch groups turns on and off the portion between the other end part of the input capacitance C1 of the amplification unit provided in correspondence to the same vertical signal line as that of the switch group and the vertical signal line two lines before the vertical signal line to which the switch group corresponds. For example, the switch S4 of the switch group corresponding to the vertical signal line V4 turns on and off the portion between the other end part of the input capacitance C1 of the amplification unit CA2 provided in correspondence to the same vertical signal line V4 as that of the switch group and the vertical signal line V2 two lines before the vertical signal line V4 to which the switch group corresponds. As illustrated in FIG. 5, there exists no vertical signal line to be connected when the switch S4 of the switch group corresponding to the vertical signal line V2 is turned on, and therefore, one end of the switch S4 is set in the floating state.

The switch S6 of each group of the above-described k/2 switch groups turns on and off the portion between the other end part of the input capacitance C3 of the amplification unit provided in correspondence to the same vertical signal line as that of the switch group and the vertical signal line two lines after the vertical signal line to which the switch group corresponds. For example, the switch S6 of the switch group corresponding to the vertical signal line V4 turns on and off the portion between the other end part of the input capacitance C3 of the amplification unit CA2 provided in correspondence to the same vertical signal line V4 as that of the switch group and the vertical signal line V6 two lines after the vertical signal line V4 to which the switch group corresponds. Although not illustrated in FIG. 5, the switch S6 of the switch group corresponding to the vertical signal line Vk is connected with the vertical signal line Vk+2 of the OB pixel unit 21B, not the vertical signal line of the effective pixel unit 21A. However, one end of the switch S6 of the switch group corresponding to the vertical signal line Vk may be set in the floating state without being connected with the vertical signal line Vk+2.

The gates of the switches S4 to S6 of the switch groups corresponding to the amplification units CA1, CA4, CA7, . . . of the above-described first group are connected in common and a control signal φ1 is supplied thereto from the imaging controlling unit 4. The gates of the amplification units CA2, CA5, CA8, . . . of the second group are connected in common and a control signal φ2 is supplied thereto from the imaging controlling unit 4. The gates of the amplification units CA3, CA6, CA9, . . . of the third group are connected in common and a control signal φ3 is supplied thereto from the imaging controlling unit 4. Each of the switches S4 to S6 turns on when the control signals φ1 to φ3 supplied to the gates thereof are at the high level (H), while it turns off when the control signals φ1 to φ3 supplied to the gates thereof are at the low level (L).

The switches S1 to S3 of each group of the above-described k/2 switch groups turn on and off the portions between the other end parts of the input capacitances C1 to C3 of the amplification unit provided in correspondence to the same vertical signal line as that of the switch group and the vertical signal line. For example, the switches S1 to S3 of the switch group corresponding to the vertical signal line V4 turn on and off the portions between the other end parts of the input capacitances C1 to C3 of the amplification unit CA2 provided in correspondence to the same vertical signal line V4 as that of the switch group and the vertical signal line V4.

The gates of the switches S1 to S3 of the above-described k/2 switch groups are connected in common and a control signal φN is supplied thereto from the imaging controlling unit 4. Each of the switches S1 to S3 turns on when the control signal φN supplied to the gate thereof is at the high level, while it turns off when the control signal φN supplied to the gate thereof is at the low level.

As will be seen from the previous explanation, in each switch group, the switches S4 to S6 configure p (in the present embodiment, three) first switches turning on and off the portions between the p (in the present embodiment, three) vertical signal lines and the p (in the present embodiment, three) input capacitances C1 to C3, respectively. Further, in each switch group, the switches S1 to S3 configure p (in the present embodiment, three) second switches turning on and off the portions between the only one vertical signal line and the input capacitances C1 to C3, respectively. In each switch group, the switches S1 to S6 configure a signal supply unit switching between a first signal supply state (state where the switches S4 to S6 are turned on and the switches S1 to S3 are turned off) where the signals of the p (in the present embodiment, three) vertical signal lines are supplied to the p (in the present embodiment, three) input capacitances C1 to C3, respectively, and a second signal supply state (state where the switches S1 to S3 are turned on and the switches S4 to S6 are turned off) where the signal of the only one vertical signal line is supplied in common to the p (in the present embodiment, three) input capacitances C1 to C3 in accordance with the control signals $\phi 1$ to $\phi 3$ and $\phi N$.

Figure 9:
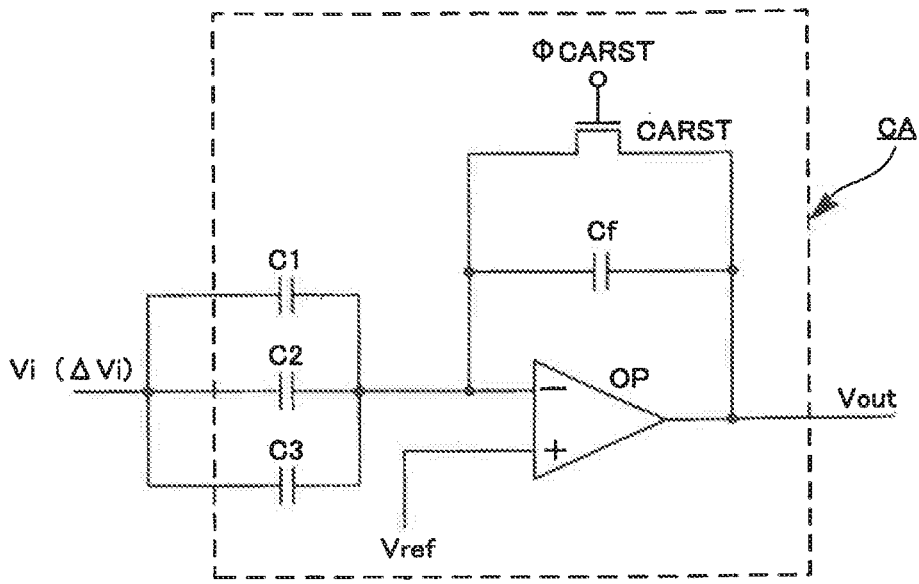
FIG. 9 is a circuit diagram illustrating a state at the time of non-addition of the amplification unit in FIG. 5.
Figure 10:
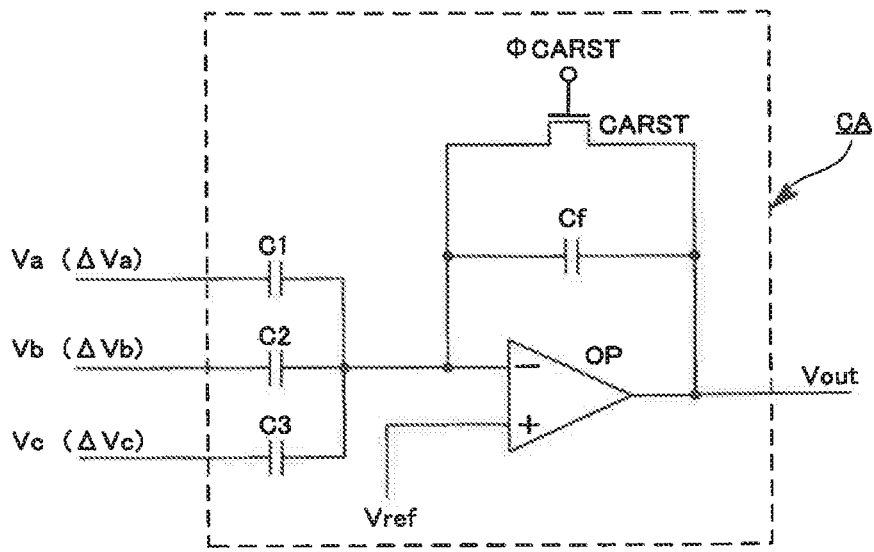
FIG. 10 is a circuit diagram illustrating a state at the time of addition of the amplification unit in FIG. 5.

FIG. 9 is a circuit diagram illustrating the state (above-described second signal supply state) at the time of non-addition of any one amplification unit CA of the above-described amplification units CA1 to CA (k/2). FIG. 10 is a circuit diagram illustrating the state (above-described first signal supply state) at the time of addition of any one amplification unit CA of the above-described amplification units CA1 to CA (k/2). In FIG. 9 and FIG. 10, the line for supplying the operation control signal $\phi$STBY is omitted. In the following explanation, the capacity values of the input capacitances C1 to C3 and the feedback capacitance Cf are also denoted by the same symbols C1 to C3 and Cf, respectively.

In the above-described second signal supply state, the switches S1 to S3 of the corresponding switch group are turned on and the switches S4 to S6 are turned off, and therefore, as illustrated in FIG. 9, the input capacitances C1 to C3 are connected in parallel and the signal of the corresponding one vertical signal line is input to the input capacitances C1 to C3 connected in parallel as an input voltage Vi. For example, when the amplification unit CA is the amplification unit CA2, the input voltage Vi is the signal of the vertical signal line V4.

In this case, when the signal $\phi$CARST becomes the high level, the column amplifier reset switch CARST turns on and the inverting input pin and the output pin of the operational amplifier OP are short-circuited, and therefore, the output pin of the operational amplifier OP is reset to the predetermined potential Vref. After that, in the state where the signal $\phi$CARST is set to the low level and the column amplifier reset switch CARST is turned off, if the input voltage Vi changes by $\phi$Vi, a signal (output voltage) Vout of the output pin of the operational amplifier OP will be [Vref−{(C1+C2+C3)/Cf}×ΔVi]. As described above, when the column amplifier reset switch CARST turns off, an inverted gain {−(C1+C2+C3)/Cf} is obtained in the ratio of the parallel combined capacitance (C1+C2+C3) of the input capacitances C1 to C3 to the feedback capacitance Cf.

Consequently, in the state illustrated in FIG. 9, the amplified output by the amount of change ΔVi of the signal Vi of the corresponding vertical signal line, i.e., the signal in the non-addition state of one vertical signal line is obtained as the output signal Vout.

A modified amplification unit, which is the amplification unit CA in the present embodiment in which the input capacitances C1 to C3 are used as a single input capacitance and the single input capacitance is connected fixedly to a predetermined vertical signal line, is known as a so-called column amplifier. The timing of the signal $\phi$CARST in the present embodiment may be taken as the same timing of the publicly-known column amplifier, and therefore, explanation thereof is omitted. This point is the same also in the state of FIG. 10.

In the above-described first signal supply state, the switches S4 to S6 of the corresponding switch group are turned on and the switches S1 to S3 are turned off, and therefore, as illustrated in FIG. 10, the input sides of the input capacitances C1 to C3 are electrically separated from one another and the signals of the corresponding three vertical signal lines are input to the input capacitances C1 to C3 as input voltages Va, Vb, and Vc, respectively. For example, when the amplification unit CA is the amplification unit CA2, the input voltage Va is the signal of the vertical signal line V2, the input voltage Vb is the signal of the vertical signal line V4, and the input voltage Vc is the signal of the vertical signal line V6.

In this case, when the signal $\phi$CARST becomes the high level, the column amplifier reset switch CARST turns on and the inverting input pin and the output pin of the operational amplifier OP are short-circuited and the output pin of the operational amplifier OP is reset to the predetermined potential Vref. After that, in the state where the signal $\phi$CARST is set to the low level and the column amplifier reset switch CARST is turned off, if the input voltages Va, Vb, and Vc change by ΔVa, ΔVb, and ΔVc, respectively, the signal (output voltage) Vout of the output pin of the operational amplifier OP will be [Vref−[{(C1/Cf)×ΔVa}+{(C2/Cf)×ΔVb}+{(C3/Cf)×ΔVc}]]. As described above, when the column amplifier reset switch CARST turns off, an inverted gain [{(C1/Cf)×ΔVa}+{(C2/Cf)×ΔVb}+{(C3/Cf)×ΔVc}], which is the result of addition of {(C1/Cf)×ΔVa} and {(C2/Cf)×ΔVb} and {(C3/Cf)×ΔVc}, is obtained.

For example, assuming that C1=C2=C3=C holds, the output voltage Vout is [Vref−{(C/Cf)×(ΔVa+ΔVb+ΔVc)}] and it is possible to obtain the inverted gain, which is the result of addition of ΔVa, ΔVb, and ΔVc without weights.

By appropriately setting the relationship between the values of C1, C2, and C3, it is possible to perform weighted addition of ΔVa, ΔVb, and ΔVc by desired weight coefficients. For example, assuming that C1=C3=C and C2=α·C (α>1) hold, it is possible to perform weighted addition in which ΔVb is weighted heavier compared to ΔVa and ΔVc. In this case, the capacity value of the input capacitance C2 to which the signal of the vertical signal line located at the center of the p (in the present embodiment, three) vertical signal lines to be added is supplied is set larger than the capacity value of the input capacitances C1 and C3 to which the signal of the vertical signal line at the position distant from the center of the above-described p vertical signal lines is supplied. In this case, the weight of the signal of the central vertical signal line existing at the center of gravity of the signal after addition is set heavier than the weight of the signal of the vertical signal line at the position distant from the center, and therefore, it is possible to achieve improvement in image quality after addition. However, not limited thereto, it may also be possible to set, for example, C1=C2=C3.

As described above, in the state illustrated in FIG. 10, the amplified output by the addition with weights or without weights of the change amounts ΔVa, ΔVb, and ΔVc of the signals Va, Vb, and Vc of the corresponding three vertical signal lines, i.e., the signal in the added state of the three vertical signal lines is obtained as the output signal Vout.

Here, FIG. 6 is referred to. In the present embodiment, as partially illustrated in FIG. 6, the upper side signal output circuit 24 has the {(m/2)−(k/2)} switch groups each including the switches S1 to S6 and the {(m/2)−(k/2)} amplification units CA(k/2)+1 to CA(m/2) provided in correspondence to the vertical signal lines Vk+2, Vk+4, . . . , Vm of the even-numbered columns of the OB pixel unit 21B. These are for the OB pixel OB and are configured, respectively, in the same manner as the k/2 switch groups each including the switches S1 to S6 and the k/2 amplification units CA1 to CA(k/2) provided in correspondence to the vertical signal lines V2, V4, . . . , Vk of the even-numbered columns of the effective pixel unit 21A explained in relation to FIG. 5.

However, the present embodiment is configured such that for the effective pixel PX, the horizontal pixel addition and the horizontal pixel non-addition are switched, but for the OB pixel OB, the signals of all the columns of the OB pixel OB are always read as the horizontal pixel non-addition.

In other words, in the OB pixel switch group, the high level is applied fixedly to the gates of the switches S1 to S3 and the switches S1 to S3 are always turned on and the low level is applied fixedly to the gates of the switches S4 to S6, and thus the switches S4 to S6 are always turned off. Accordingly, the OB pixel amplification units CA(k/2)+1 to CA(m/2) are fixed to the non-addition state illustrated in FIG. 9. In order to realize the same electrically connected state as this, the OB pixel switch group may be removed and the portions connected by the switches S1 to S3 in the on state may be connected by wires. However, in this case, the uniformity of the circuit degrades and the offset etc. easily occurs in the signal, and therefore, it is preferable to provide the OB pixel switch group as in the present embodiment.

Further, to the operational amplifiers OP of the OB pixel amplification units CA(k/2)+1 to CA(m/2), an operation control signal φSTBY-OB independent from the operation control signals φSTBY1 to φSTBY3 is supplied, and thereby it is possible to bring the OB pixel amplification units CA(k/2)+1 to CA(m/2) into the operating state at all times independently from the previously-described amplification units CA1 to CA(k/2).

As illustrated in FIG. 7, the upper side signal output circuit 24 has the sampling units CDS1 to CDS(m/2) provided in correspondence to the previously-described amplification units CA1 to CA(m/2), respectively, the horizontal scan circuit 31, horizontal signal lines 32N and 32S, horizontal line reset transistors RTHS and RTHN, and output amplifiers APS and APN.

The horizontal scan circuit 31 outputs a horizontal scan signal φH for each of the sampling units CDS1 to CDS(m/2) or for each of those selected therefrom and performs control of the horizontal scan under the control of the imaging controlling unit 4. Here, (m/2) attached to φH indicates the signal of the m-th column.

To the sampling units CDS1 to CDS(m/2), the output pins of the operational amplifiers OP of the corresponding amplification units CA1 to CA(m/2) are connected. Each of the sampling units CDS1 to CDS(m/2) has a first capacitance CS and a second capacitance CN. In the present embodiment, the first capacitance CS is a capacitance for accumulating light signals etc. The second capacitance CN is a capacitance for accumulating difference signals including noise components to be removed from the above-described light signals etc. Further, each of the sampling units CDS1 to CDS(m/2) has first and second input switches TVS and TVN and first and second output switches THS and THN.

Each of the sampling units CDS1 to CDS(m/2) samples and holds the output signals Vout of the corresponding amplification units CA1 to CA(m/2) in accordance with control signals φTVN and φTVS, and also supplies the held signals to the horizontal signal lines 32N and 32S in accordance with the horizontal scan signal φH from the horizontal scan circuit 31. The light signals etc. and difference signals output to the horizontal signal lines 32N and 32S are amplified via the output amplifiers APS and APN respectively and output to the signal processing unit 5 in FIG. 1. The signal processing unit 5 obtains a difference between outputs of the output amplifiers APS and APN by a differential amplifier etc. Accordingly, correlation double sampling is realized. Such a differential amplifier etc. may be mounted on the solid state imaging device 3. The sampling units CDS1 to CDS(m/2) are provided in order to remove the offset of the amplification units CA1 to CA(m/2). The horizontal line reset transistors RTHS and RTHN reset the horizontal signal lines 32S and 32N respectively to a predetermined potential Vref0 with predetermined timing in accordance with a horizontal line reset control signal φRTH.

The sampling units CDS1 to CDS(m/2) themselves such as these are publicly known, and therefore, detailed explanation thereof is omitted.

Although not illustrated in the drawing, the lower side signal output circuit 25 in FIG. 2 is a circuit obtained by inverting the upper side signal output circuit 24 upside down. However, in the lower side signal output circuit 25, the portions connected to the vertical signal lines V2, V4, . . . , Vm respectively of the even-numbered columns in the upper side signal output circuit 24 are connected to the vertical signal lines V1, V3, . . . , Vm−1 respectively of the odd-numbered columns in the pixel unit 21.

In the present embodiment, the signal output circuit is separated into the upper side signal output circuit 24 and the lower side signal output circuit 25 as described above, and therefore, it is possible to effectively make use of the space and also to speed up the processing by concurrently performing both processing. However, in the present invention, the signal output circuit may be arranged on only one side of the upper side and the lower side.

Next, the operation example of the solid state imaging device 3 illustrated in FIG. 2 is explained.

In the present embodiment, at the time of normal actual shooting (at the time of still image shooting) etc., the operation mode in which the signals of all the pixels PX are read by horizontal pixel non-addition (hereinafter, called the "horizontal pixel non-addition read mode") is performed.

Figure 11:
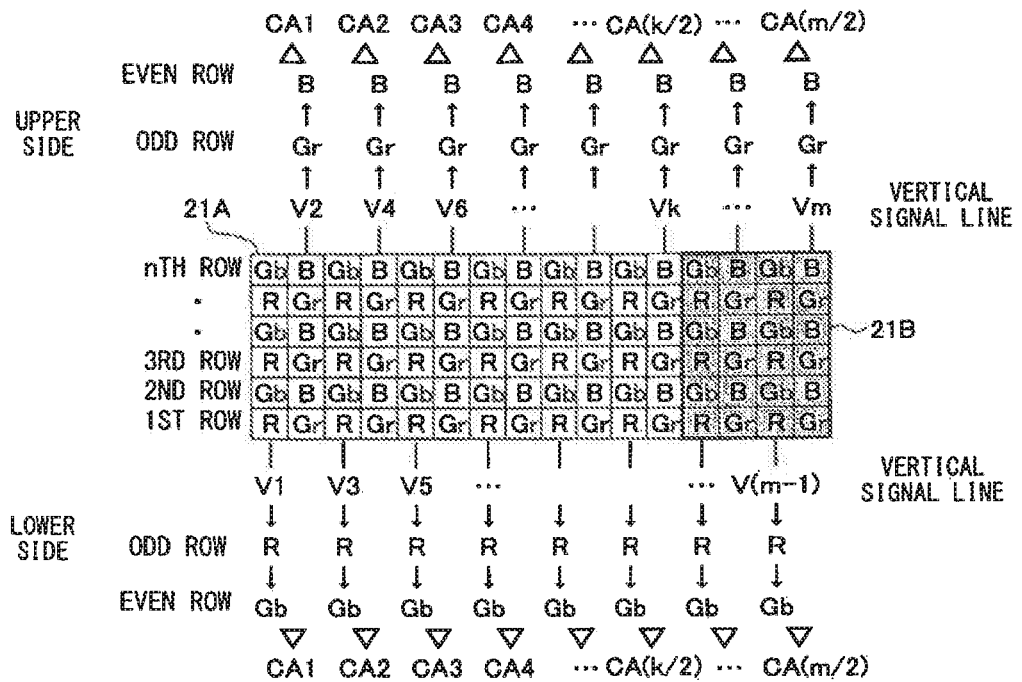
FIG. 11 is an operation explanatory diagram schematically illustrating a characteristic operation of a horizontal pixel non-addition read mode of the solid state imaging device illustrated in FIG. 2.
Figure 12:
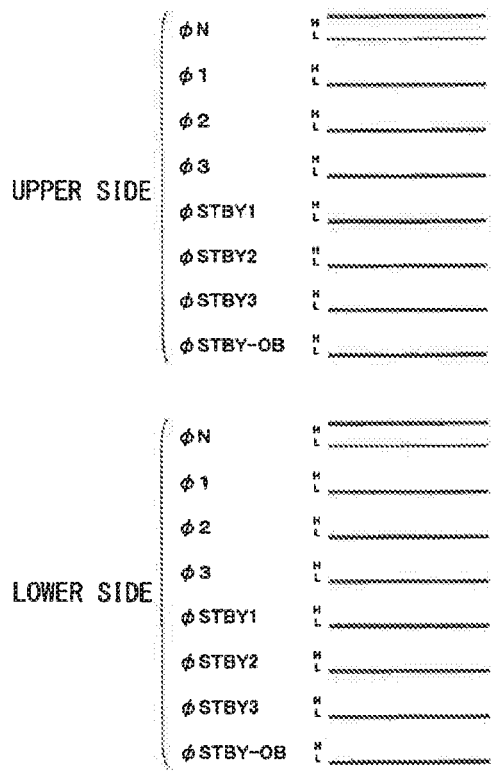
FIG. 12 is a timing chart illustrating a state of control signals in the horizontal pixel non-addition read mode of the solid state imaging device illustrated in FIG. 2.

FIG. 11 is an operation explanatory diagram schematically illustrating the characteristic operation of the horizontal pixel non-addition read mode of the solid state imaging device 3 illustrated in FIG. 2. FIG. 12 is a timing chart illustrating the state of the control signals in the horizontal pixel non-addition read mode of the solid state imaging device 3 illustrated in FIG. 2.

As illustrated in FIG. 12, in the horizontal pixel non-addition read mode, the control signal φN (of the upper side signal output circuit 24 and the lower side signal output circuit 25) on the upper side and the lower side is kept at the high level, while the control signals φ1, φ2, and φ3 on the upper side and the lower side are kept at the low level. Consequently, each of the effective pixel amplification units CA1 to CA(k/2) on the upper side and the lower side is kept in the non-addition state illustrated in FIG. 9. Each of the OB pixel amplification units CA(k/2)+1 to CA(m/2) on the upper side and the lower side is originally fixed to the non-addition state illustrated in FIG. 9.

In the horizontal pixel non-addition read mode, as will also be understood from FIG. 11, the vertical signal lines V2, V4, . . . , Vm of the even-numbered columns are connected to the input units in the non-addition state illustrated in FIG. 9 of the amplification units CA1 to CA(m/2) on the upper side, respectively. Further, in the horizontal pixel non-addition read mode, as will also be understood from FIG. 11, the vertical signal lines V1, V3, . . . , Vm−1 of the odd-numbered columns are connected to the input units in the non-addition state illustrated in FIG. 9 of the amplification units CA1 to CA(m/2) on the lower side, respectively.

Furthermore, in the horizontal pixel non-addition read mode, as illustrated in FIG. 12, the operation control signals φSTBY1 to φSTBY3 and φSTBY-OB on the upper side and the lower side are kept at the low level and all the amplification units CA1 to CA(m/2) on the upper side and the lower side are kept in the operating state.

Then, in the horizontal pixel non-addition read mode, under the control of the imaging controlling unit 4, the first row to the n-th row are sequentially selected one by one as a read target by the vertical scan circuit 23 and the signal of each of the pixels PX, OB of the row to be read is output to the vertical signal lines V1 to Vm of the corresponding column.

As illustrated in FIG. 11, when the odd-numbered rows are to be read, to the vertical signal lines V2, V4, . . . , Vm of the even-numbered columns, the signals of the Gr pixels (effective pixel PX and OB pixel OB provided with the Gr color filter) of the corresponding columns are output, and to the vertical signal lines V1, V3, . . . , Vm−1 of the odd-numbered columns, the signals of the R pixels of the corresponding columns are output. The signals of the Gr pixels output to the vertical signal lines V2, V4, . . . , Vm of the even-numbered columns, after amplified by the amplification units CA1 to CA(m/2) on the upper side in the non-addition state illustrated in FIG. 9 and also in the operating state, are sampled by the sampling units CDS1 to CDS(m/2) on the upper side, and then all the sampled signals of the Gr pixels are output sequentially from the output amplifiers APS and APN by the horizontal scan circuit 31 on the upper side. The signals of the R pixels output to the vertical signal lines V1, V3, . . . , Vm−1 of the odd-numbered columns, after amplified by the amplification units CA1 to CA(m/2) on the lower side in the non-addition state illustrated in FIG. 9 and also in the operating state, are sampled by the sampling units CDS1 to CDS(m/2) on the lower side, and then all the sampled signals of the R pixels are output sequentially from the output amplifiers APS and APN by the horizontal scan circuit 31 on the lower side.

As illustrated in FIG. 11 when the even-numbered rows are to be read, to the vertical signal lines V2, V4, . . . , Vm of the even-numbered columns, the signals of the B pixels of the corresponding columns are output and to the vertical signal lines V1, V3, . . . , Vm−1 of the odd-numbered columns, the signals of the Gb pixels of the corresponding columns are output. The signals of the B pixels output to the vertical signal lines V2, V4, . . . , Vm of the even-numbered columns, after amplified by the amplification units CA1 to CA(m/2) on the upper side in the non-addition state illustrated in FIG. 9 and also in the operating state, are sampled by the sampling units CDS1 to CDS(m/2) on the upper side, and then all the sampled signals of the B pixels are output sequentially from the output amplifiers APS and APN by the horizontal scan circuit 31 on the upper side. The signals of the Gb pixels output to the vertical signal lines V1, V3, . . . , Vm−1 of the odd-numbered columns, after amplified by the amplification units CA1 to CA(m/2) on the lower side in the non-addition state illustrated in FIG. 9 and also in the operating state, are sampled by the sampling units CDS1 to CDS(m/2) on the lower side, and then all the sampled signals of the Gb pixels are output sequentially from the output amplifiers APS and APN by the horizontal scan circuit 31 on the lower side.

In this manner, in the horizontal pixel non-addition read mode, it is possible to read the signals of all the pixels PX and OB without performing horizontal addition.

In the present embodiment, in the electronic viewfinder mode, in the motion image shooting, etc., the operation mode in which the signals of the effective pixels PX are read by performing horizontal pixel addition (hereinafter, called the "horizontal pixel addition read mode") is performed.

Figure 13:
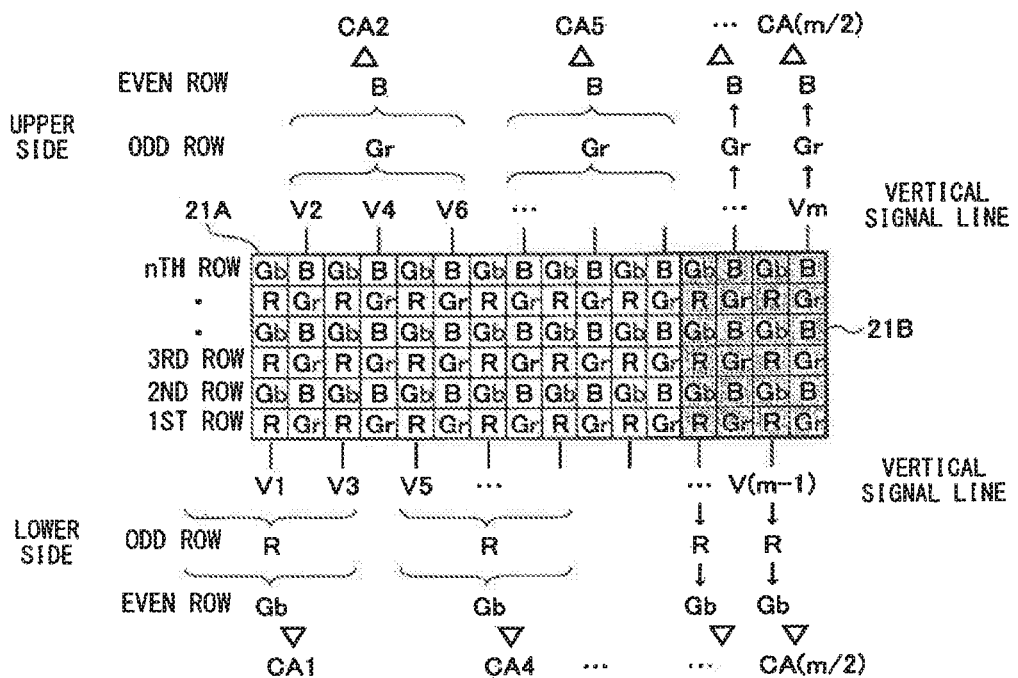
FIG. 13 is an operation explanatory diagram schematically illustrating a characteristic operation of a horizontal pixel addition read mode of the solid state imaging device illustrated in FIG. 2.
Figure 14:
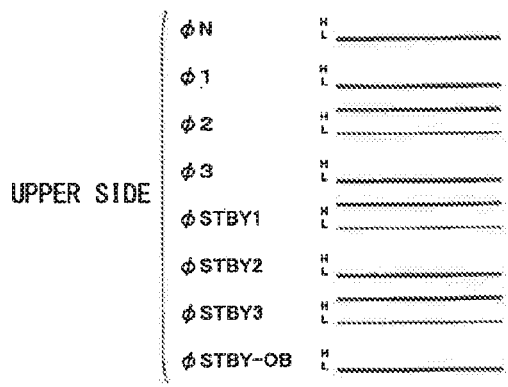
FIG. 14 is a timing chart illustrating a state of control signals in the horizontal pixel addition read mode of the solid state imaging device illustrated in FIG. 2.
Figure 14:
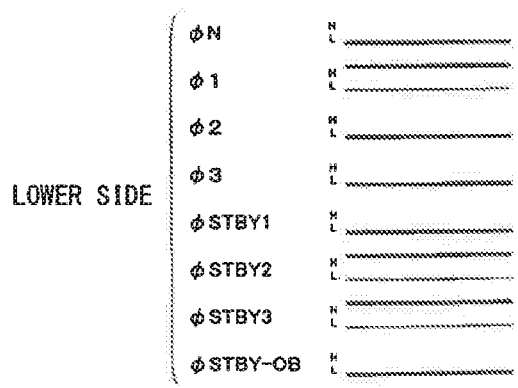

FIG. 13 is an operation explanatory diagram schematically illustrating the characteristic operation of the horizontal pixel addition read mode of the solid state imaging device 3 illustrated in FIG. 2. FIG. 14 is a timing chart illustrating the state of the control signals in the horizontal pixel addition read mode of the solid state imaging device 3 illustrated in FIG. 2.

In the horizontal pixel addition read mode, as illustrated in FIG. 14, the control signal φN on the upper side and the lower side is kept at the low level. Consequently, each of the effective pixel amplification units CA1 to CA(k/2) on the upper side and the lower side is kept in the addition state illustrated in FIG. 10. On the other hand, the OB pixel amplification units CA(k/2)+1 to CA(m/2) on the upper side and the lower side are originally fixed to the non-addition state illustrated in FIG. 9.

In the horizontal pixel addition read mode, the control signal φ2 on the upper side is kept at the high level, the control signals φ1 and φ3 on the upper side are kept at the low level, and in accordance with this, the signals of the vertical signal lines to be added in the effective pixel amplification units CA2, CA5, CA8, . . . on the upper side are determined and, for example, in the effective pixel amplification unit CA2 on the upper side, the signals of the vertical signal lines V2, V4, and V6 are added. On the other hand, the control signal φ1 on the lower side is kept at the high level, the control signals φ2 and φ3 on the lower side are kept at the low level, and in accordance with this, the signals of the vertical signal lines to be added in the effective pixel amplification units CA1, CA4, CA7, . . . on the lower side are determined and, for example, in the effective pixel amplification unit CA4 on the lower side, the signals of the vertical signal lines V5, V7, and V9 are added.

In the horizontal pixel addition read mode, as illustrated in FIG. 14, the control signals φSTBY2 and φSTBY-OB on the upper side are kept at the low level and φSTBY1 and φSTBY3 on the upper side are kept at the high level. Consequently, in the upper side signal output circuit 24, as to the effective pixel unit 21A, only the effective pixel amplification units CA2, CA5, CA8, . . . are kept in the operating state and the remaining effective pixel amplification units CA1, CA3, CA4, CA6, CA7, CA9, . . . are kept in the operation suspended state. The OB pixel amplification units CA(k/2)+1 to CA(m/2) on the upper side are kept in the operating state.

In the horizontal pixel addition read mode, as illustrated in FIG. 14, the control signals φSTBY1 and φSTBY-OB on the lower side are kept at the low level and φSTBY2 and φSTBY3 on the lower side are kept at the high level. Consequently, in the lower side signal output circuit 25, as to the effective pixel unit 21A, only the effective pixel amplification units CA1, CA4, CA7, . . . are kept in the operating state and the remaining effective pixel amplification units CA2, CA3, CA5, CA6, CA8, CA9, . . . are kept in the operation suspended state. The OB pixel amplification units CA(k/2)+1 to CA(m/2) on the lower side are kept in the operating state.

Then, in the horizontal pixel addition read mode, under the control of the imaging controlling unit 4, the first row to the n-th row are sequentially selected one by one as a read target by the vertical scan circuit 23 and the signals of each of the pixels PX and OB of the row to be read are output to the vertical signal lines V1 to Vm of the corresponding columns.

As illustrated in FIG. 13, when the odd-numbered rows are to be read, to the vertical signal lines V2, V4, . . . , Vm of the even-numbered columns, the signals of the Gr pixels (the effective pixel PX and the OB pixel OB provided with the Gr color filter) of the corresponding columns are output and to the vertical signal lines V1, V3, . . . , Vm−1 of the odd-numbered columns, the signals of the R pixels of the corresponding columns are output.

The signals of the Gr pixels output to the vertical signal lines V2, V4, . . . , Vk of the even-numbered columns are added in such a manner that the signals of the three Gr pixels not overlapping one another are added in this unit each time by the effective pixel amplification units CA2, CA5, CA8, . . . on the upper side in the addition state illustrated in FIG. 10 and also in the operating state. As will be understood from FIG. 13, the interval in the row direction between the positions of the center of gravity of each Gr pixel after the addition is the same pitch. The signals of the Gr pixels output to the vertical signal lines Vk+2, . . . , Vm of the even-numbered columns are amplified by the OB pixel amplification units CA(k/2)+1 to CA(m/2) on the upper side in the non-addition state illustrated in FIG. 9 and also in the operating state. The output signals of the amplification units CA1 to CA(m/2) on the upper side including these significant signals are sampled by the sampling units CDS1 to CDS(m/2) on the upper side, and the sampled signals are output sequentially from the output amplifiers APS and APN by the horizontal scan circuit 31 on the upper side. At this time, it may also be possible to cause the horizontal scan circuit 31 on the upper side to output all the sampled signals (to read all the columns) or to selectively output only the output signals (addition signals of the Gr pixels) of the effective pixel amplification units CA2, CA5, CA8, . . . on the upper side and the output signals (addition signals of the Gr pixels) of the OB pixel amplification units CA(k/2)+1 to CA(m/2) on the upper side (to selectively read the columns). In the former case, it is only required not to use unnecessary signals in the circuits in the subsequent stages.

The signals of the R pixels output to the vertical signal lines V1, V3, . . . , Vk−1 of the odd-numbered columns are added in such a manner that the signals of the three R pixels not overlapping one another are added in this unit each time by the effective pixel amplification units CA1, CA4, CA7, . . . on the lower side in the addition state illustrated in FIG. 10 and also in the operating state. As will be understood from FIG. 13, the interval in the row direction between the positions of the center of gravity of each R pixel after the addition is the same pitch, and the interval between the position of the center of gravity of the signal of each R pixel after the addition and the position of the center of gravity of the signal of each Gr pixel after the addition is also the same pitch. The signals of the R pixels output to the vertical signal lines Vk+1, . . . , Vm−1 of the odd-numbered columns are amplified by the OB pixel amplification units CA(k/2)+1 to CA(m/2) on the lower side in the non-addition state illustrated in FIG. 9 and also in the operating state. The output signals of the amplification units CA1 to CA(m/2) on the lower side including these significant signals are sampled by the sampling units CDS1 to CDS(m/2) on the lower side, and then the sampled signals are output sequentially from the output amplifiers APS and APN by the horizontal scan circuit 31 on the lower side. At this time, it may also be possible to cause the horizontal scan circuit 31 on the lower side to output all the sampled signals (to read all the columns) or to selectively output only the output signals (addition signals of the R pixels) of the effective pixel amplification units CA1, CA4, CA7, . . . on the lower side and the output signals (addition signals of the R pixels) of the OB pixel amplification units CA(k/2)+1 to CA(m/2) on the lower side (to selectively read the columns). In the former case, it is only required not to use unnecessary signals in the circuits in the subsequent stages.

As shown in FIG. 13, when the even-numbered rows are to be read, to the vertical signal lines V2, V4, . . . , Vm of the even-numbered columns, the signals of the B pixels of the corresponding columns are output and to the vertical signal lines V1, V3, . . . , Vm−1 of the odd-numbered columns, the signals of the Gb pixels of the corresponding columns are output.

The signals of the B pixels output to the vertical signal lines V2, V4, . . . , Vk of the even-numbered columns are added in such a manner that the signals of the three B pixels not overlapping one another are added in this unit each time by the effective pixel amplification units CA2, CA5, CA8, . . . on the upper side in the addition state illustrated in FIG. 10 and also in the operating state. As will be understood from FIG. 13, the interval in the row direction between the positions of the center of gravity of each B pixel after the addition is the same pitch. The signals of the B pixels output to the vertical signal lines Vk+2, . . . , Vm of the even-numbered columns are amplified by the OB pixel amplification units CA(k/2)+1 to CA(m/2) on the upper side in the non-addition state illustrated in FIG. 9 and also in the operating state. The output signals of the amplification units CA1 to CA(m/2) on the upper side including these significant signals are sampled by the sampling units CDS1 to CDS(m/2) on the upper side, and then the sampled signals are output sequentially from the output amplifiers APS and APN by the horizontal scan circuit 31 on the upper side. At this time, it may also be possible to cause the horizontal scan circuit 31 on the upper side to output all the sampled signals (to read all the columns) or to selectively output only the output signals (addition signals of the Gr pixels) of the effective pixel amplification units CA2, CA5, CA8, . . . on the upper side and the output signals (addition signals of the B pixels) of the OB pixel amplification units CA(k/2)+1 to CA(m/2) on the upper side (to selectively read the columns). In the former case, it is only required not to use unnecessary signals in the circuits in the subsequent stages.

The signals of the Gb pixels output to the vertical signal lines V1, V3, . . . , Vk−1 of the odd-numbered columns are added in such a manner that the signals of the three Gb pixels not overlapping one another are added in this unit each time by the effective pixel amplification units CA1, CA4, CA7, . . . on the lower side in the addition state illustrated in FIG. 10 and also in the operating state. As will be understood from FIG. 13, the interval in the row direction between the positions of the center of gravity of each Gb pixel after the addition is the same pitch, and the interval between the position of the center of gravity of the signal of each Gb pixel after the addition and the position of the center of gravity of the signal of each B pixel after the addition is also the same pitch. The signals of the Gb pixels output to the vertical signal lines Vk+1, . . . , Vm−1 of the odd-numbered columns are amplified by the OB pixel amplification units CA(k/2)+1 to CA(m/2) on the lower side in the non-addition state illustrated in FIG. 9 and also in the operating state. The output signals of the amplification units CA1 to CA(m/2) on the lower side including these significant signals are sampled by the sampling units CDS1 to CDS(m/2) on the lower side, and then the sampled signals are output sequentially from the output amplifiers APS and APN by the horizontal scan circuit 31 on the lower side. At this time, it may also be possible to cause the horizontal scan circuit 31 on the lower side to output all the sampled signals (to read all the columns) or to selectively output only the output signals (addition signals of the Gb pixels) of the effective pixel amplification units CA1, CA4, CA7, . . . on the lower side and the output signals (addition signals of the Gb pixels) of the OB pixel amplification units CA(k/2)+1 to CA(m/2) on the lower side (to selectively read the columns). In the former case, it is only required not to use unnecessary signals in the circuits in the subsequent stages.

In this manner, in the horizontal pixel addition read mode, it is possible to read the signals of the effective pixels PX by performing horizontal addition, while it is possible to read the signals of all the OB pixels OB without performing horizontal pixel addition.

In order to obtain final moving images etc. from the signals thus read, for example, it may also be possible to perform three-pixel addition processing in the vertical direction in the signal processing unit 5 or in the image processing unit 13 in FIG. 1. Alternatively, in the previously-described example, the rows are read one by one by the vertical scan circuit 23, but it may also be possible to read every three rows and to read while thinning in the vertical direction. Alternatively, it may also be possible to configure the solid state imaging device 3 so as to be capable of adding pixels in the vertical direction and to perform pixel addition read also in the vertical direction. These points are the same also in a second embodiment, to be described later.

In the present embodiment, both in the horizontal pixel non-addition read mode and in the horizontal pixel addition read mode, the control signal φ3 is kept at the low level, and therefore, the switches S4 to S6 (refer to FIG. 5) corresponding thereto may be removed. However, in this case, the uniformity of the circuit degrades and the offset easily occurs in the signal, and therefore, it is preferable to provide the switches S4 to S6 corresponding to the control signal φ3 as in the present embodiment.

According to the present embodiment, the amplification units C1 to Ck are in charge of not only the amplification function but also the horizontal pixel addition function (function in the addition state illustrated in FIG. 10), and therefore, it is possible to add the pixel signals in the horizontal direction without using a dedicated addition circuit which adds the pixel signals in the horizontal direction.

Further, according to the present embodiment, in the horizontal pixel addition read mode, the amplification units not involved in the necessary signal processing (the effective pixel amplification units CA1, CA3, CA4, CA6, CA7, CA9, . . . on the upper side and the effective pixel amplification units CA2, CA3, CA5, CA6, CA8, CA9, . . . on the lower side) are kept in the operation suspended state where power consumption is small, and therefore, it is possible to achieve reduction in power consumption.

Furthermore, in the present embodiment, as described previously, in the horizontal pixel addition read mode, the interval in the row direction between the positions of the center of gravity of the pixels of each color after the addition is the same pitch and also, the interval in the row direction between the positions of the center of gravity of pixels of different colors after the addition is the same pitch. Consequently, according to the present embodiment, moire and false color are hard to occur.

The above-described horizontal pixel addition read mode may be modified as follows. In other words, the control signal φN on the upper side and the lower side may be kept at the low level, the control signals φ1 to φ3 on the upper side and the lower side may be kept at the high level, and the control signals φSTBY1 to φSTBY3 and φSTBY-OB on the upper side and the lower side may be kept at the low level.

In this case, the signals obtained by respectively adding the signals from the pixels of each p columns (in the present embodiment, three columns) provided with the color filters of the same color and from the pixels of the p columns (in the present embodiment, three columns) adjacent to one another in the row direction, and from the pixels of each p columns (in the present embodiment, three columns) shifted sequentially by two columns to both sides in the row direction are obtained from each of the effective pixel amplification units CA1 to CA(k/2) on the upper side and the lower side. In this case, the horizontal scan circuits 31 on the upper side and the lower side are caused to read all the sampled output signals of the effective pixel amplification units CA1 to CA(k/2) on the upper side and the lower side.

In this modification example, although the image reduction effect is not obtained in horizontal direction, it possible to obtain the same effect as the effect of the optical low pass filter in the horizontal direction.

Second Embodiment

Figure 15:
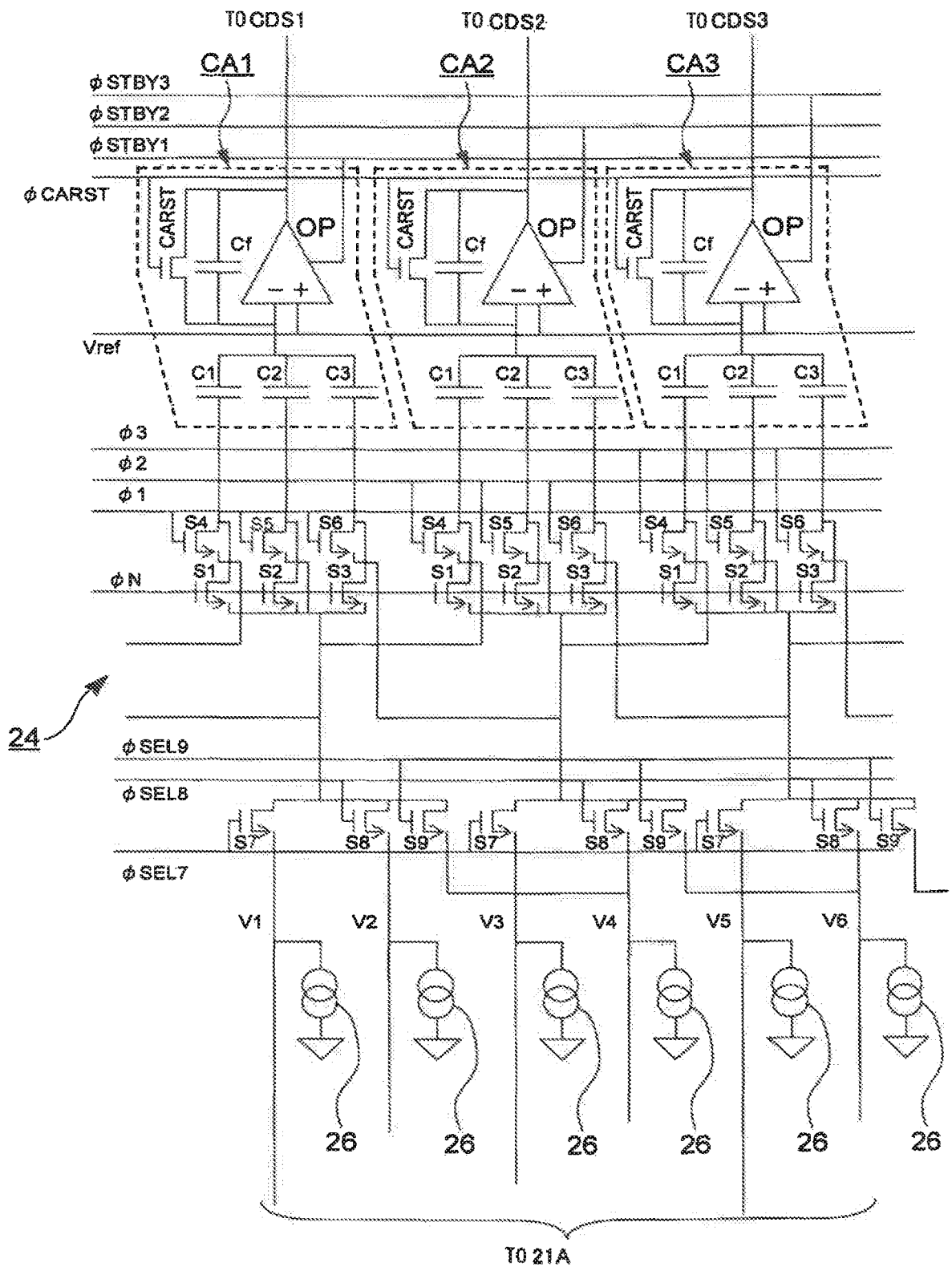
FIG. 15 is a circuit diagram illustrating a portion of an upper side signal output circuit of a solid state imaging device used in an electronic camera according to a second embodiment.
Figure 16:
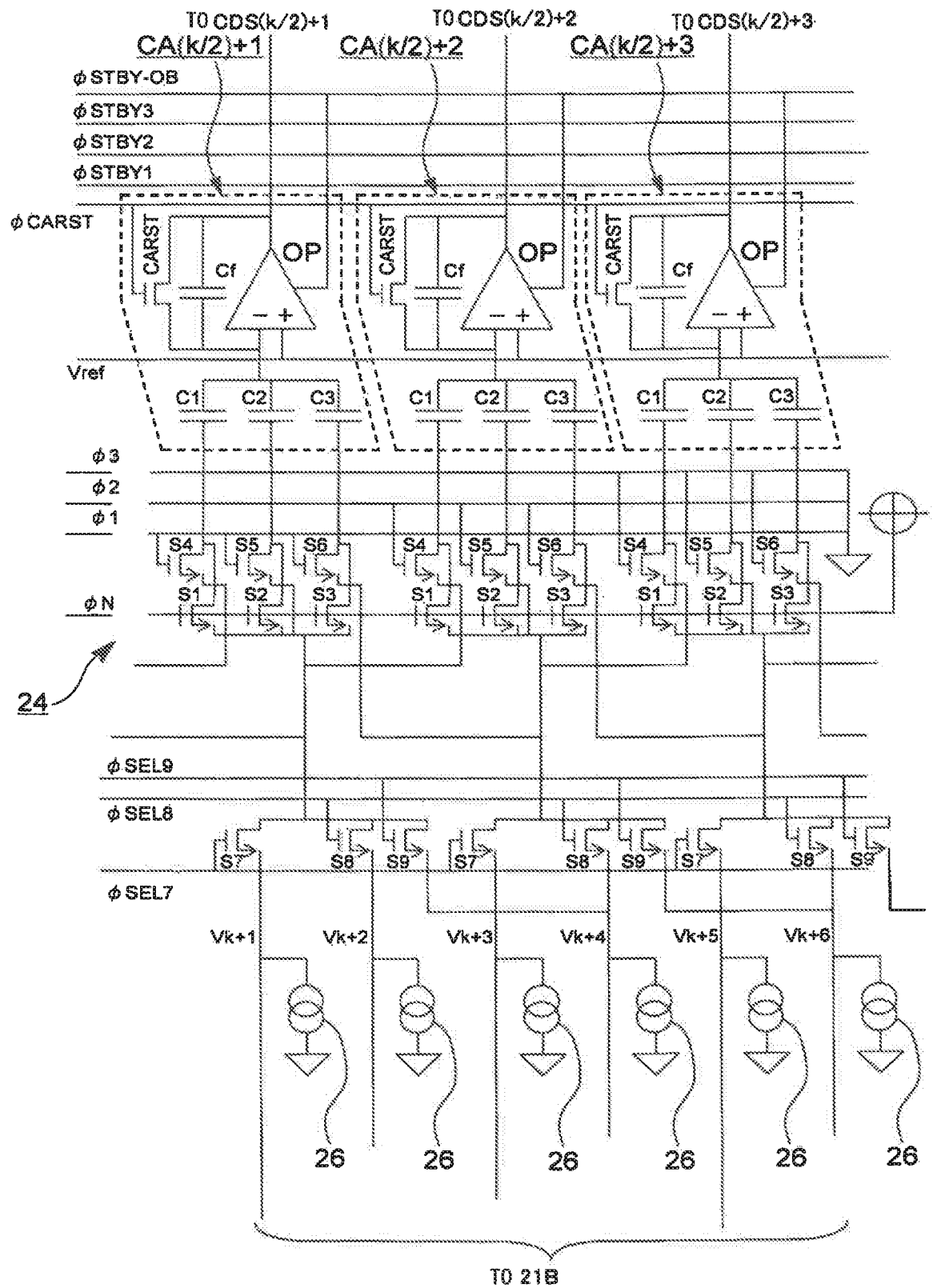
FIG. 16 is a circuit diagram illustrating another portion of the upper side signal output circuit of the solid state imaging device used in the electronic camera according to the second embodiment.

FIG. 15 is a circuit diagram showing a part of the upper side signal output circuit 24 in a solid state imaging device which is used in an electronic camera according to a second embodiment, and corresponds to FIG. 5. FIG. 16 is a circuit diagram showing the other part of the upper side signal output circuit 24 in the solid state imaging device which is used in the electronic camera according to the second embodiment, and corresponds to FIG. 6. In FIG. 15 and FIG. 16, the same sign is attached to an element the same as or corresponding to the element in FIG. 5 and FIG. 6, and repeated explanation thereof will be omitted.

The present embodiment is different from the above described first embodiment in the points explained in the following.

In the present embodiment, in the upper side signal output circuit 24, m/2 vertical line selection switch groups (line selection units) each including switches S7 to S9 are added corresponding to the m/2 amplification units CA1 to CA(m/2), respectively, and corresponding to the m/2 switch groups each including switches S1 to S6, respectively.

The switches S7 to S9 in each of the vertical line selection switch groups are provided such that the point connected to each of the vertical signal lines V2, V4, . . . , Vm of the even columns in the upper side signal output circuit 24 of the above described first embodiment can be selectively connected to any of the corresponding vertical signal line, the vertical signal line one line before the corresponding signal line, and the vertical signal line two lines after the corresponding vertical signal line.

For example, the switches S7 to S9 of the vertical line selection switch group corresponding to the amplification unit CA1 in the upper side signal output circuit 24 are provided such that the point connected to the vertical signal line V2 in the upper side signal output circuit 24 of the above described first embodiment can be selectively connected to any of the corresponding vertical signal line V2, the vertical signal line V1 one line before the corresponding vertical signal line V2, and the vertical signal line V4 two lines after the corresponding vertical signal line V2. When the switch S7 is selectively turned on of the switches S7 to S9 of this vertical line selection switch group, the point connected to the vertical signal line V2 in the upper side signal output circuit 24 of the above described first embodiment is selectively connected to the vertical signal line V1 on the nearest side to the first column among the options. When the switch S8 is selectively turned on of the switches S7 to S9 of this vertical line selection switch group, the point connected to the vertical signal line V2 in the upper side signal output circuit 24 of the above described first embodiment is selectively connected to the vertical signal line V2 on the second nearest side to the first column among the options. When the switch S9 is selectively turned on of the switches S7 to S9 of this vertical line selection switch group, the point connected to the vertical signal line V2 in the upper side signal output circuit 24 of the above described first embodiment is selectively connected to the vertical signal line V4 on the third nearest side to the first column among the options.

Further, for example, the switches S7 to S9 of the vertical line selection switch group corresponding to the amplification unit CA2 in the upper side signal output circuit 24 are provided such that the point connected to the vertical signal line V4 of the upper side signal output circuit 24 in the above described first embodiment can be selectively connected to any of the corresponding vertical signal line V4, the vertical signal line V3 one line before the corresponding vertical signal line V4, and the vertical signal line V6 two lines after the corresponding vertical signal line V4. When the switch S7 is selectively turned on of the switches S7 to S9 of this vertical line selection switch group, the point connected to the vertical signal line V4 in the upper side signal output circuit 24 of the above described first embodiment is selectively connected to the vertical signal line V3 on the nearest side to the first column among the options. When the switch S8 is selectively turned on of the switches S7 to S9 of this vertical line selection switch group, the point connected to the vertical signal line V4 in the upper side signal output circuit 24 of the above described first embodiment is selectively connected to the vertical signal line V4 on the second nearest side to the first column among the options. When the switch S9 is selectively turned on of the switches S7 to S9 of this vertical selection group, the point connected to the vertical signal line V4 in the upper side signal output circuit 24 of the above described first embodiment is selectively connected to the vertical signal line V6 on the third nearest side to the first column among the options.

The switches S7 to S9 in each of the above described m/2 vertical line selection switch groups include nMOS transistors. The switches S7 in the respective vertical line selection switch groups are connected in common, and a control signal φSEL7 is supplied thereto from the imaging controlling unit 4. The switches S8 in the respective vertical line selection switch groups are connected in common, and a control signal φSEL8 is supplied thereto from the imaging controlling unit 4. The switches S9 in the respective vertical line selection switch groups are connected in common, and a control signal φSEL9 is supplied thereto from the imaging controlling unit 4. The switches S7 to S9 are turned on when the control signals φSEL7 to φSEL9 supplied to the gates thereof are at the high level, while the switches S7 to S8 are turned off when the control signals φSEL7 to φSEL9 supplied to the gates thereof are at the low level.

In the present embodiment, the lower side signal output circuit 25 is a circuit obtained by simply inverting the above described upper side signal output circuit 24 upside down.

Next, an operation example of the solid state imaging device 3 in the present embodiment will be explained.

Also in the present embodiment, at the time of normal actual shooting (at the time of still image shooting) or the like, the operation mode of reading the signals of all the pixels PX in the horizontal pixel non-addition (in the following, called the "horizontal pixel non-addition read mode") is performed.

Figure 17:
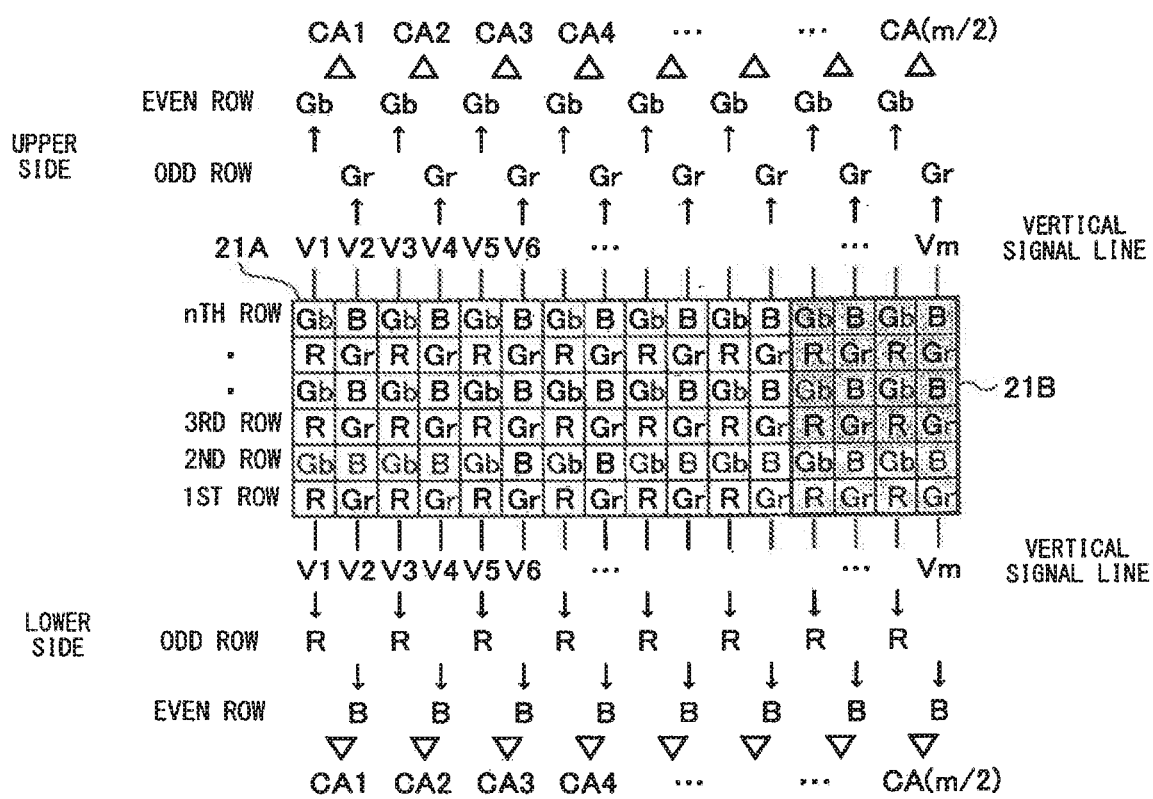
FIG. 17 is an operation explanatory diagram schematically illustrating a characteristic operation of a horizontal pixel non-addition read mode of the solid state imaging device used in the electronic camera according to the second embodiment.
Figure 18:
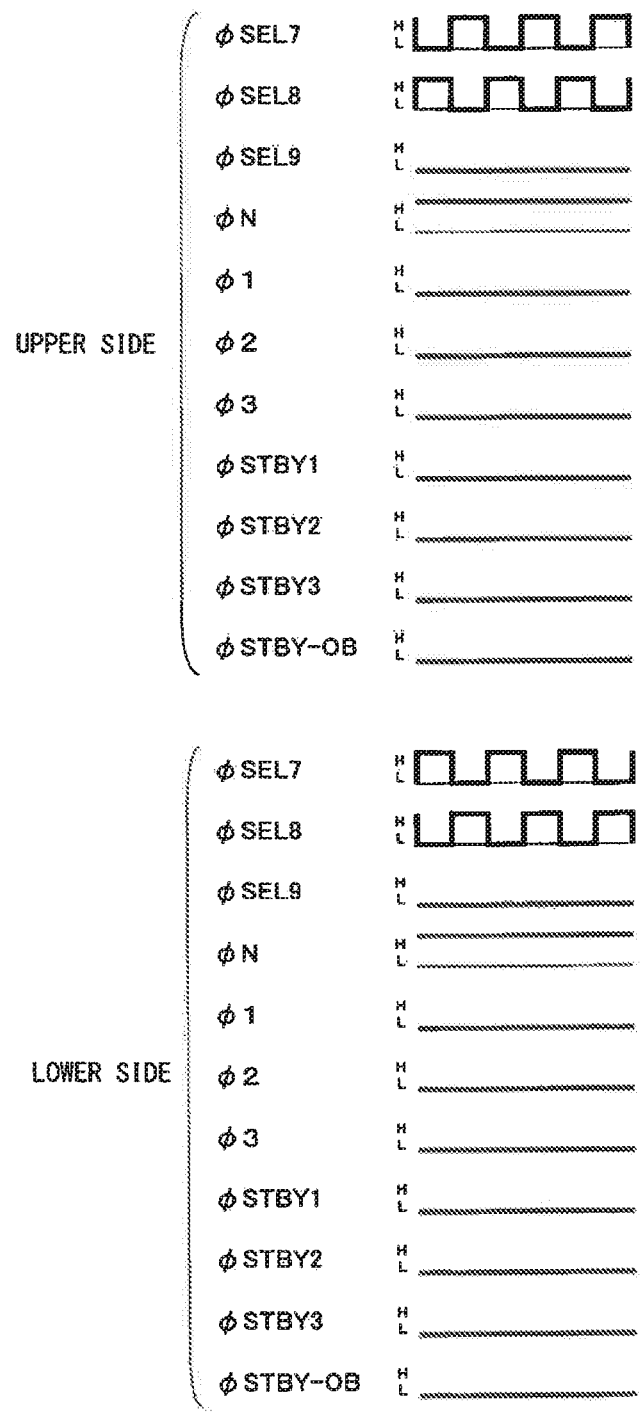
FIG. 18 is a timing chart illustrating a state of control signals in the horizontal pixel non-addition read mode of the solid state imaging device used in the electronic camera according to the second embodiment.

FIG. 17 is an operation explanation diagram schematically showing a characteristic operation in the horizontal pixel non-addition read mode of the solid state imaging device 3 in the present embodiment, and corresponds to FIG. 11. FIG. 18 is a timing chart showing a control signal state in the horizontal pixel non-addition read mode of the solid state imaging device 3 in the present embodiment, and corresponds to FIG. 12.

The horizontal pixel non-addition read mode in the present embodiment is different from the horizontal pixel non-addition read mode in the above described first embodiment only in the following point.

In the horizontal pixel non-addition read mode of the present embodiment, the upper side and lower side control signals φSEL9 are kept at the low level, and, when the odd-numbered row is a read target, the lower side control signal φSEL7 is caused to have the high level while the upper side control signal φSEL7 is set to the low level, and also the lower side control signal φSEL8 is set to the low level while the upper side control signal φSEL8 is set to the high level. When the even-numbered row is the read target, the lower side control signal φSEL7 is set to the low level while the upper side control signal φSEL7 is set to the high level, and also the lower side control signal φSEL8 is set to the high level while the upper side control signal φSEL8 is set to the low level.

Thereby, as can be understood from FIG. 17, differently from FIG. 11, not only the Gr pixel signal but also the Gb pixel signal is output from the upper side amplification unit, and the neighboring Gr pixel signal and the Gb pixel signal are processed in the same upper side amplification unit. Accordingly, in the horizontal pixel non-addition read mode of the present embodiment, influence of a level difference between the amplification units is not easily exerted, compared with the case that the neighboring Gr pixel signal and Gb pixel signal are processed respectively by the different upper side and lower side amplification units as in the case of FIG. 11.

Also in the present embodiment, in the electronic viewfinder mode, in the motion image shooting, and the like, the operation mode of reading the signals of the effective pixels PX by performing the horizontal pixel addition (in the following, called the "horizontal pixel addition read mode") is performed.

Figure 19:
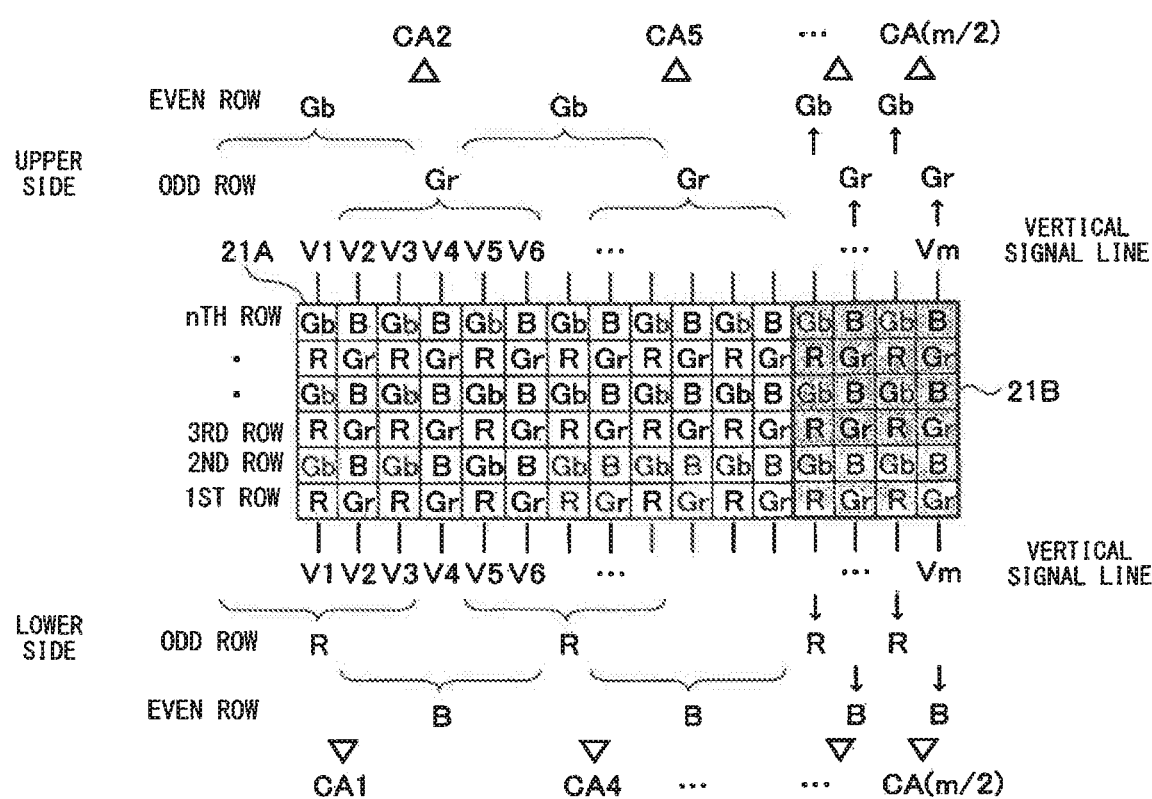
FIG. 19 is an operation explanatory diagram schematically illustrating a characteristic operation of a horizontal pixel addition read mode of the solid state imaging device used in the electronic camera according to the second embodiment.
Figure 20:
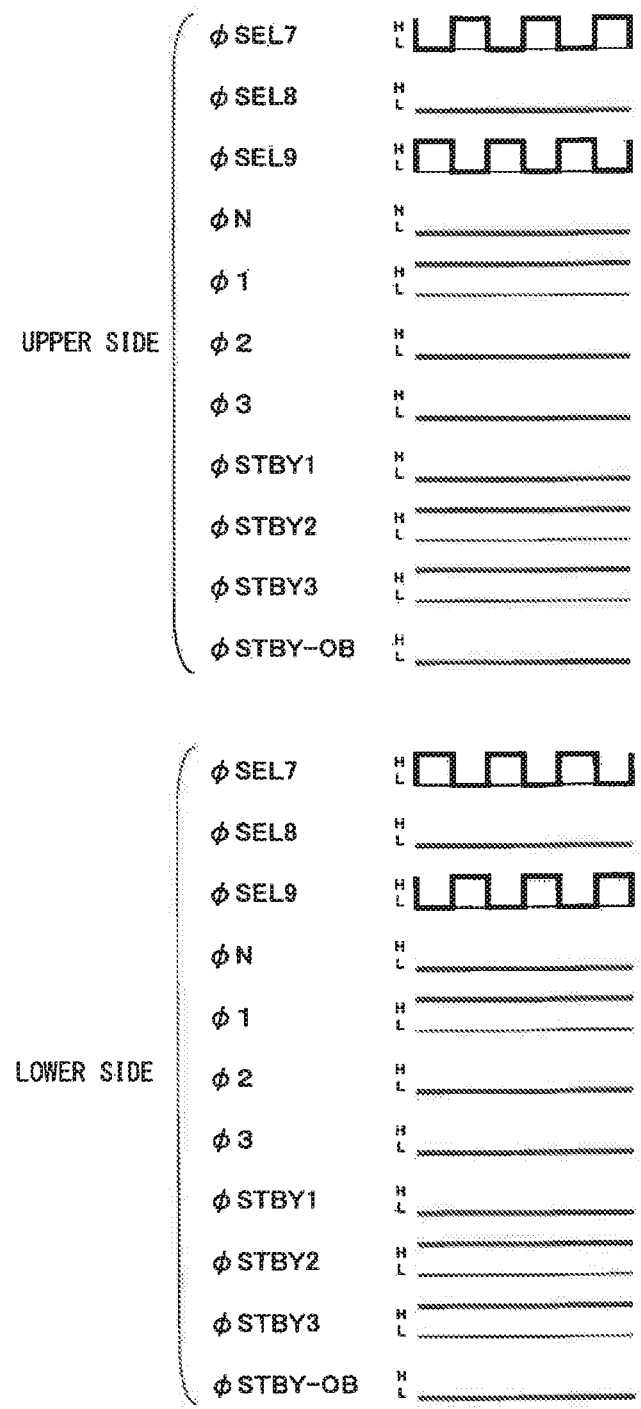
FIG. 20 is a timing chart illustrating a state of control signals in the horizontal pixel addition read mode of the solid state imaging device used in the electronic camera according to the second embodiment.

FIG. 19 is an operation explanation diagram schematically showing a characteristic operation in the horizontal pixel addition read mode of the solid state imaging device 3 in the present embodiment, and corresponds to FIG. 13. FIG. 20 is a timing chart showing a control signal state in the horizontal pixel addition read mode of the solid state imaging device 3 in the present embodiment, and corresponds to FIG. 14.

In the horizontal pixel addition read mode in the present embodiment, as shown in FIG. 20, the control signal φN on the upper side and lower side is kept at the low level, the control signal φ1 on the upper side and lower side is kept at the high level, the control signals φ2 and φ3 on the upper side and lower side are kept at the low level, the control signals φSTBY1 and φSTBY-OB on the upper side and lower side are kept at the low level, and the φSTBY2 and φSTBY3 on the upper side and lower side are kept at the high level.

Further, in the horizontal pixel addition read mode in the present embodiment, as shown in FIG. 20, the control signal φSEL8 on the upper side and lower side is kept at the low level, and, when the odd-numbered rows are to be read, the control signal φSEL7 on the lower side is set to the high level while the control signal φSEL7 on the upper side is set to the low level, and also the control signal φSEL9 on the lower side is set to the low level while the control signal φSEL9 on the upper side is set to the high level. When the even-numbered rows are to be read, the control signal φSEL7 on the lower side is set to the low level while the control signal φSEL7 on the upper side is set to the high level, and also the control signal φSEL9 on the lower side is set to the high level while the control signal φSEL9 on the upper side is set to the low level.

Therefore, as can be understood from FIG. 19, differently from FIG. 13, not only the signal of Gr pixel but also the signal of Gb pixel is output from the upper side signal output circuit 24 on the upper side. At this time, the interval in the row direction between the positions of the center of gravity of the pixels of each color after the addition is the same pitch and also, the interval in the row direction between the positions of the center of gravity of pixels of different colors after the addition is the same pitch.

In the present embodiment, when the control signal φSEL8 on the upper side is kept at the high level, the control signals φSEL7 and φSEL9 on the upper side are kept at the low levels, the lower side control signal φSEL7 on the lower side is kept at the high level, and the control signals φSEL8 and φSEL9 on the lower side are kept at the low level, the solid state imaging device 3 in the present embodiment has completely the same connection state as the above described solid state imaging device 3 in the first embodiment. Accordingly, also in the present embodiment, by keeping such a connection state, it is possible to realize the above described horizontal pixel non-addition read mode and horizontal pixel addition read mode in the first embodiment.

Explanation of Third Embodiment

Figure 21:
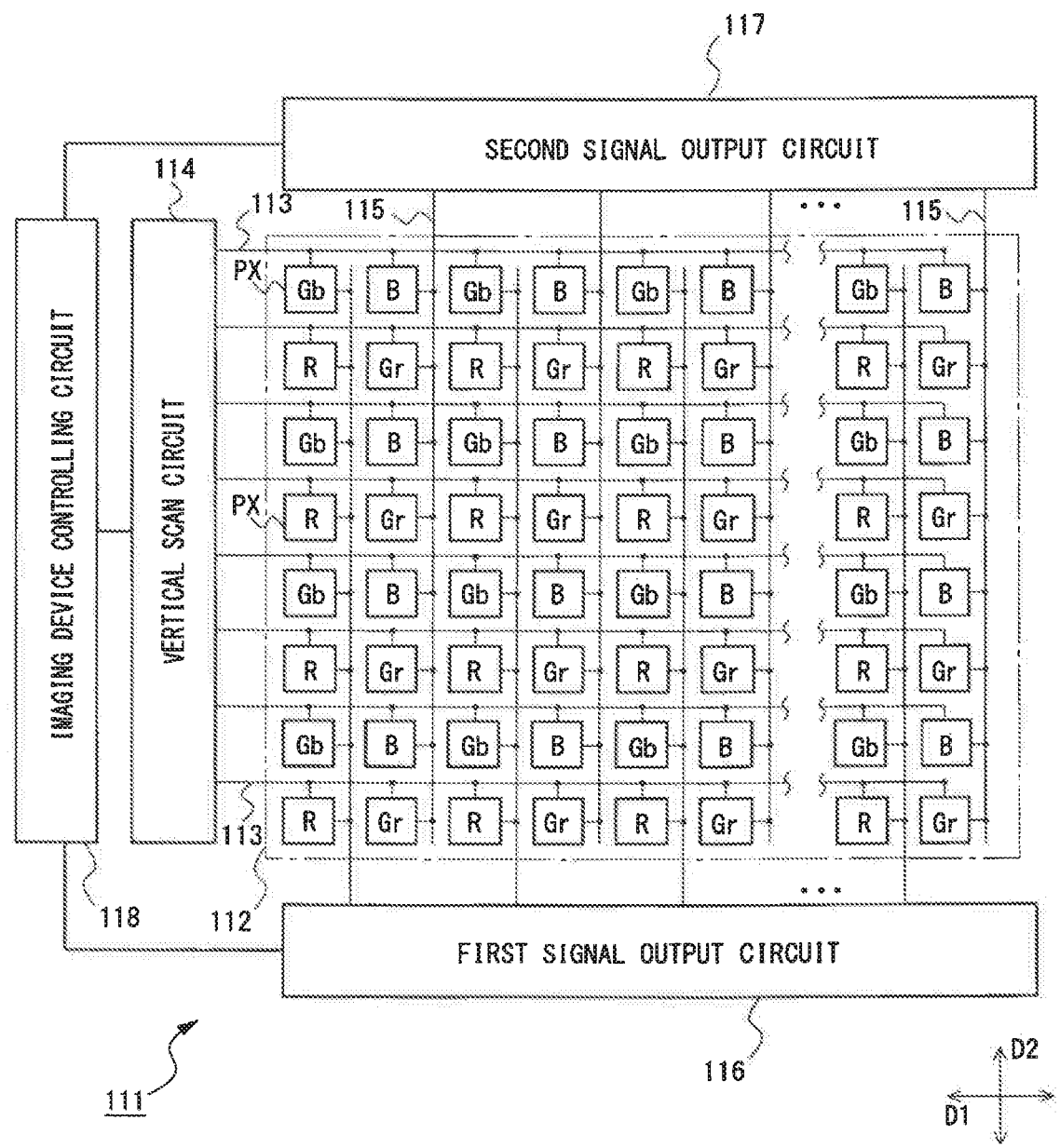
FIG. 21 is a block diagram illustrating a configuration example of a solid state imaging device in a third embodiment.

FIG. 21 is a block diagram showing a configuration example of a solid state imaging device of a third embodiment. The solid state imaging device of the third embodiment is an X-Y address type solid state imaging device formed on a silicon substrate using a CMOS (Complementary Metal-Oxide Semiconductor) process. The solid state imaging device of the third embodiment is mounted on an imaging apparatus such as a digital still camera and a video camera, for example (note that a configuration example of the imaging apparatus will be described below).

Further, the solid state imaging device of the third embodiment has an operation mode of reading an electrical signal of each pixel independently (normal read mode) and an operation mode of mixing and reading electrical signals from a plurality of the pixels (mixed read mode).

A solid state imaging device 111 includes a pixel array 112, a plurality of horizontal control signal lines 113, a vertical scan circuit 114, a plurality of vertical signal lines 115, a first signal output circuit 116, a second signal output circuit 117, and an imaging device controlling circuit 118.

The pixel array 112 includes a plurality of pixels PX which converts incident light to electrical signals. The pixels PX of the pixel array 112 are arranged in a matrix in a first direction D1 and in a second direction D2 on a light receiving plane. In the following, the first direction D1 and the second direction D2 are also referred to as a row direction D1 and a column direction D2, respectively. Note that, while the arrangement of the pixels PX are shown schematically in FIG. 21, obviously further more pixels are arranged on the light receiving plane of an actual solid state imaging device.

Here, plural kinds of color filter which transmit light having respective different color components are disposed in a predetermined color arrangement on the front face of each of the pixels PX. Accordingly, the pixel PX outputs an electrical signal corresponding to each of the colors through color decomposition by the color filter. For example, in the third embodiment, red (R), green (Gr and Gb), and blue (B) color filters are disposed on each of the pixels PX according to the Bayer arrangement of two rows and two columns. Thereby, the pixel array 112 can obtain a color image at the time of imaging. In the following, the pixels PX having filters of red (R), green (Gr or Gb), and blue (B) are also referred to as a red pixel (R), a green pixel (Gr or Gb) and a blue pixel (B), respectively.

When the row direction D1 is focused on, the red pixel (R) and the green pixel (Gr) are disposed alternately in the odd row of the pixel array 112, for example. Further, the green pixel (Gb) and the blue pixel (B) are disposed alternately in the even row of the pixel array 112, for example.

Further, when the column direction D2 is focused on, the green pixel (Gb) and the red pixel (R) are disposed alternately in the odd column of the pixel array 112, for example. Further, the blue pixel (B) and the green pixel (Gr) are disposed alternately in the even column of the pixel array 112, for example.

Further, the horizontal control signal line 113 connected to the vertical scan circuit 114 is disposed in each row of the pixel array 112. Each of the horizontal control signal lines 113 supplies control signals (selection signal φSEL, reset signal φRST, and transfer signal φTX to be described below) output from the vertical scan circuit 114 to each pixel group arranged in the row direction D1.

Further, the vertical signal line 115 which is an example of a signal read line is disposed in each of columns of the pixel array 112. The plurality of pixels PX disposed in the column direction D2 is connected to one another by the vertical signal line 115 provided for each of the columns. That is, the pixel array 112 outputs the output signals from the plurality of pixels PX disposed in the same column via the common vertical signal line 115.

Note that, in the third embodiment, each of the vertical signal lines 115 of the odd columns corresponding to the green pixels (Gb) and the red pixels (R) is connected to the first signal output circuit 116 which is located on the lower side in FIG. 21. Further, each of the vertical signal lines 115 of the even columns corresponding to the blue pixels (B) and the green pixels (Gr) is connected to the second signal output circuit 117 which is located on the upper side of FIG. 21.

Figure 22:
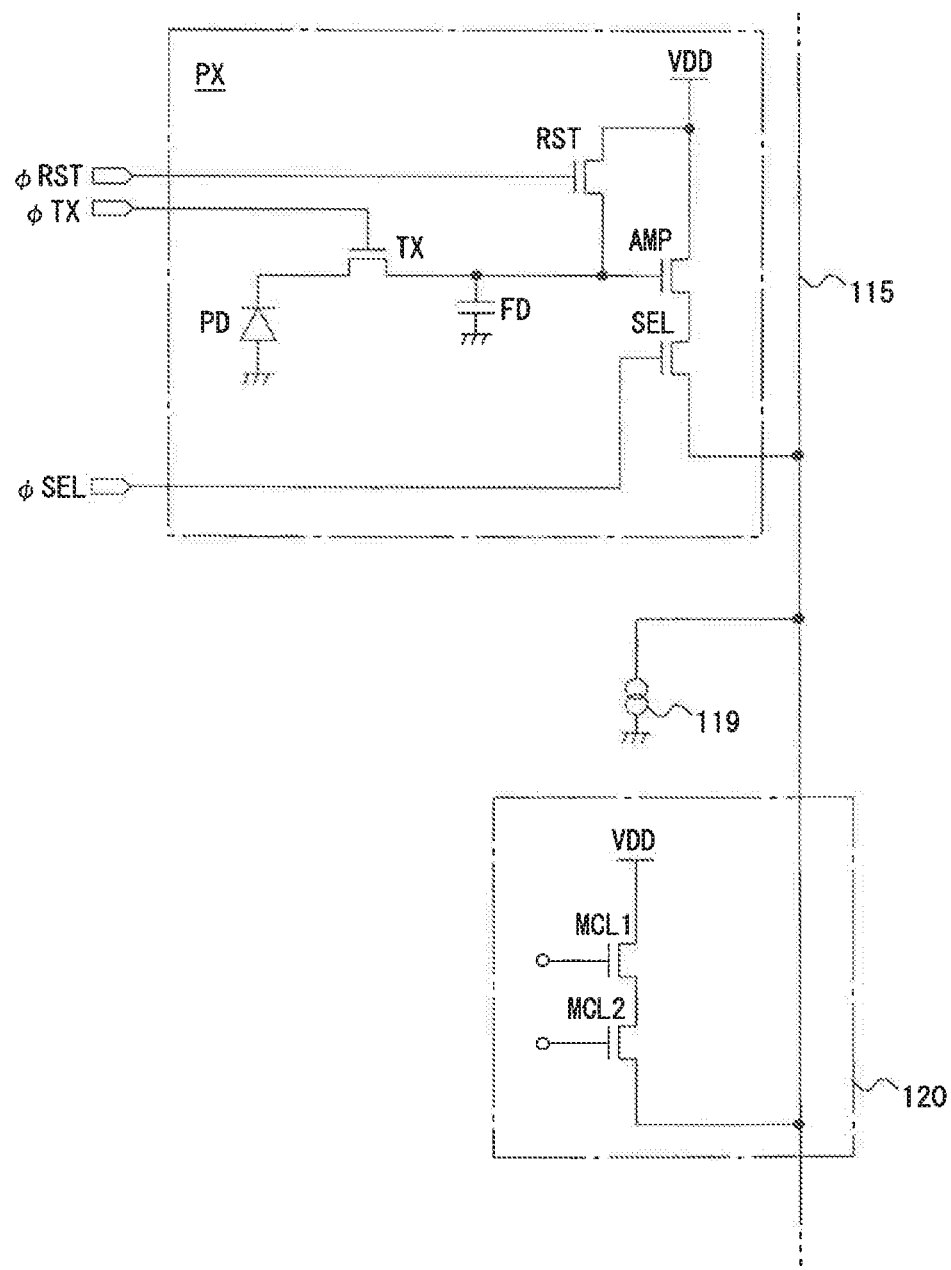
FIG. 22 is a diagram illustrating a circuit configuration example of a pixel PX.

Here, with reference to FIG. 22, there will be explained a circuit configuration example of the pixel PX.

Each of the pixels PX includes a photodiode PD, a transfer transistor TX, a reset transistor RST, an amplification transistor AMP, a selection transistor SEL, and a floating diffusion FD.

The photodiode PD generates a signal charge according to a light amount of incident light by photoelectrical conversion. The transfer transistor TX is turned on while the transfer signal φTX is at the high level, and transfers the signal charge accumulated in the photodiode PD to the floating diffusion FD.

The source of the transfer transistor TX is used as the photodiode PD, and the drain of the transfer transistor TX is used as the floating diffusion FD. The floating diffusion FD is a diffusion region formed by introduction of impurities into a semiconductor substrate, for example. Here, the floating diffusion FD is connected to the gate of the amplification transistor AMP and the source of the reset transistor RST.

The reset transistor RST is turned on while the reset signal φRST is at the high level, and resets the floating diffusion FD to a power supply voltage VDD. Further, the drain of the amplification transistor AMP is connected to the power supply voltage VDD, the gate thereof is connected to the floating diffusion FD, and the source thereof is connected to the drain of the selection transistor SEL, and the amplification transistor AMP configures a source follower circuit with a constant current source 119 (not shown in FIG. 21) connected to the vertical signal line 115 as a load. The amplification transistor AMP outputs a read voltage according to a voltage value of the floating diffusion FD via the selection transistor SEL. The selection transistor SEL is turned on while the selection signal φSEL is at the high level, and connects the source of the amplification transistor AMP to the vertical signal line 115.

Here, each of the vertical signal lines 115 is connected with a clip circuit 120 (not shown in FIG. 21) which clips the voltage of the vertical signal line 115 to a predetermined value. For example, the clip circuit 120 includes a transistor MCL1 generating a clip voltage and a transistor MCL2 controlling on/off of the clipping. Here, the clip circuit 120 is formed by means of connecting the transistors MCL1 and MCL2 in a cascode, also connecting the drain of the transistor MCL1 to the power supply voltage VDD, and connecting the source of the transistor MCL2 to the vertical signal line 115.

Returning to FIG. 21, the first signal output circuit 116 and the second signal output circuit 117 are disposed in parallel on the upper and lower sides with the pixel array 112 in between. The first signal output circuit 116 is disposed on the lower side in FIG. 21, and is a circuit reading the image signals (Gb or R) of the odd columns in the pixel array 112 along the row direction D1 for each of the colors. Further, the second signal output circuit 117 is disposed on the upper side in FIG. 21 and is a circuit reading the image signals (B or Gr) of the even columns in the pixel array 112 along the row direction D1 for each of the colors. In this manner, by providing the signal output circuits on both sides (upper and lower) of the pixel array 112, it is possible to read the image signals from the pixel array 112 in a high speed.

Further, the first signal output circuit 116 and the second signal output circuit 117 mix and read the image signals from the plurality of pixels PX disposed in the direction (row direction D1) crossing the extension direction (column direction D2) of the vertical signal line 115, in the mixed read mode. Note that the first signal output circuit 116 and the second signal output circuit 117 in the third embodiment perform the mixed read for the signals of three pixels having the same color in the row direction D1 in the mixed read mode (details of the mixed read will be described below).

The imaging device controlling circuit 118 supplies a control signal to each of the vertical scan circuit 114, the first signal output circuit 116, and the second signal output circuit 117.

Note that the above described control signal may be supplied from a controlling unit of an imaging apparatus on which the solid state imaging device of the third embodiment is mounted. In the above described case, the imaging device controlling circuit 118 can be omitted from the solid state imaging device 111.

Figure 23:
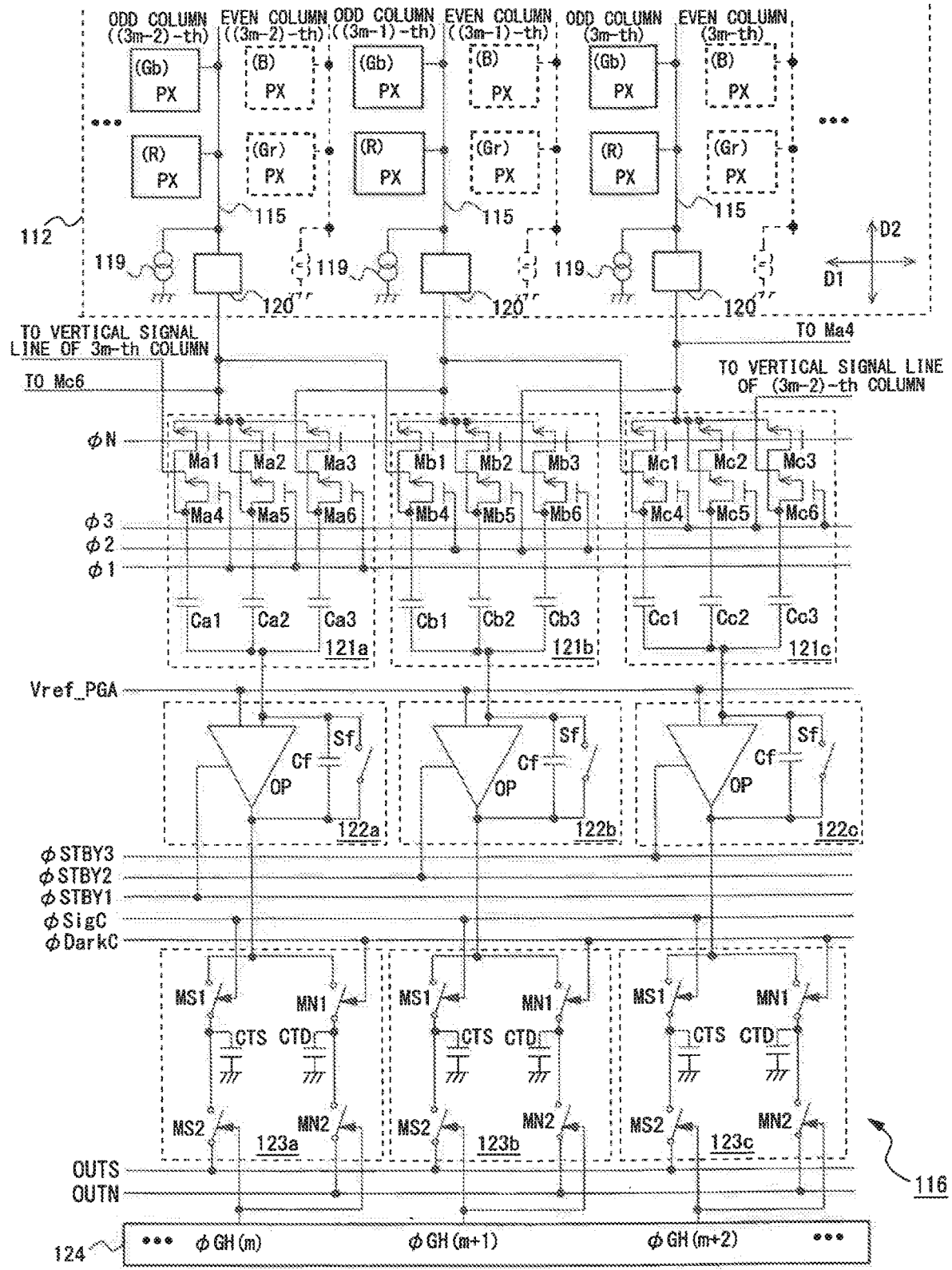
FIG. 23 is a diagram illustrating a configuration example of a first signal output circuit.

In the following, with reference to FIG. 23, a configuration example of the first signal output circuit 116 and the second signal output circuit 117 will be explained in more detail. Here, the second signal output circuit 117 is the same as the first signal output circuit 116 in a basic configuration except the point that the second signal output circuit 117 is connected with the vertical signal lines 115 of the even columns. Accordingly, in the following example, an example of the first signal output circuit 116 is shown, and any duplicated explanation about the second signal output circuit 117 will be omitted.

The first signal output circuit 116 includes a mixed read controlling unit 121, a column amplifier 122, a sample hold unit 123, and a horizontal scan circuit 124. One set of the mixed read controlling unit 121, the column amplifier 122, and the sample hold unit 123 is provided for each of the vertical signal lines 115. Further, only one horizontal scan circuit 124 is provided in the first signal output circuit 116.

Note that, in the following explanation about the first signal output circuit 116, symbol a is attached to the end of the reference numeral for an element corresponding to the (3 m−2)-th odd column (e.g., 1st, 4th, or 7th), symbol b is attached to the end of the reference numeral for an element corresponding to the (3 m−1)-th odd column (e.g., 2nd, 5th, or 8th), and symbol c is attached to the end of the reference numeral for an element corresponding to the 3 m-th odd column (e.g., 3rd, 6th, or 9th) (note that m is a natural number except 0).

The mixed read controlling unit 121a-c is a circuit switching on and off of the mixed read for the pixels PX. For example, in the case of the normal read mode, the mixed read controlling unit 121 reads the output signal of the pixels PX only from a predetermined odd column in the pixel array 112. On the other side, in the case of the mixed read mode, the mixed read controlling unit 121 mixes and reads the output signals from the pixels PX of the three columns neighboring in the row direction D1 of the odd columns in the pixel array 112.

Here, the mixed read controlling unit 121a is connected to a mode selection signal line φN and a phase selection signal line φ1. The mixed read controlling unit 121b is connected to the mode selection signal line φN and the phase selection signal line φ2. The mixed read controlling unit 121c is connected to the mode selection signal line φN and the phase selection signal line φ3. Then, the mixed read controlling units 121a-c are operated independently from one another on receiving the respective phase selection signals φ1 to φ3 in the mixed read mode.

The first mixed read controlling unit 121a corresponding to the above described (3 m−2)-th column includes transistors Ma1 to Ma6 and capacitances Ca1 to Ca3. The three transistors Ma1 to Ma3, the three transistors Ma4 to Ma6, and the three capacitances Ca1 to Ca3 are disposed respectively in parallel.

Each of the gates of the transistors Ma1 to Ma3 is connected to the common mode selection signal line φN which instructs mode switching. Further, each of the sources of the transistors Ma1 to Ma3 is connected to the vertical signal line 115 corresponding to the (3 m−2)-th odd column.

Further, each of the gates of the transistors Ma4 to Ma6 is connected to the phase selection signal line φ1. Further, the source of the transistor Ma4 is connected to the vertical signal line 115 corresponding to the neighboring 3 m-th column. The source of the transistor Ma5 is connected to the vertical signal line 115 corresponding to the (3 m−2)-th column. The source of the transistor Ma6 is connected to the vertical signal line 115 corresponding to the neighboring (3 m−1)-th column.

Further, both drains of the transistors Ma1 and Ma4 are connected to the capacitance Ca1, both drains of the transistors Ma2 and Ma5 are connected to the capacitance Ca2, and both drains of the transistors Ma3 and Ma6 are connected to the capacitance Ca3. These capacitances Ca1 to Ca3 are connected to the first column amplifier 122a in the following stage and serve as an input capacitance of the first column amplifier 122a.

The second mixed read controlling unit 121b corresponding to the above described (3 m−1)-th column includes transistors Mb1 to Mb6 and capacitances Cb1 to Cb3. The three transistors Mb1 to Mb3, the three transistors Mb4 to Mb6, and the three capacitances Cb1 to Cb3 are disposed respectively in parallel.

Each of the gates of the transistors Mb1 to Mb3 is connected to the above described common mode selection signal line φN. Further, each of the sources of the transistors Mb1 to Mb3 is connected to the vertical signal line 115 corresponding to the (3 m−1)-th odd column.

Further, each of the gates of the transistors Mb4 to Mb6 is connected to the phase selection signal line φ2. Further, the source of the transistor Mb4 is connected to the vertical signal line 115 corresponding to the neighboring (3 m−2)-th column. The source of the transistor Mb5 is connected to the vertical signal line 115 corresponding to the (3 m−1)-th column. The source of the transistor Mb6 is connected to the vertical signal line 115 corresponding to the neighboring 3 m-th column.

Further, both drains of the transistors Mb1 and Mb4 are connected to the capacitance Cb1, both drains of the transistors Mb2 and Mb5 are connected to the capacitance Cb1, and both drains of the transistors Mb3 and Mb6 are connected to the capacitance Cb3. These capacitances Cb1 to Cb3 are connected to the second column amplifier 123b in the following stage and serve as an input capacitance of the second column amplifier 123b.

The third mixed read controlling unit 121c corresponding to the above described 3 m-th column includes transistors Mc1 to Mc6 and capacitances Cc1 to Cc3. The three transistors Mc1 to Mc3, the three transistors Mc4 to Mc6, and the three capacitances Cc1 to Cc3 are disposed respectively in parallel.

Each of the gates of the transistors Mc1 to Mc3 is connected to the above described common mode selection signal line φN. Further, each of the sources of the transistors Mc1 to Mc3 is connected to the vertical signal line 115 corresponding to the 3 m-th odd column.

Further, each of the gates of the transistors Mc4 to Mc6 is connected to the phase selection signal line φ3. Further, the source of the transistor Mc4 is connected to the vertical signal line 115 corresponding to the neighboring (3 m−1)-th column. The source of the transistor Mc5 is connected to the vertical signal line 115 corresponding to the 3 m-th column. The source of the transistor Mc6 is connected to the vertical signal line 115 corresponding to the neighboring (3 m−2)-th column.

Further, both drains of the transistors Mc1 and Mc4 are connected to the capacitance Cc1, both drains of the transistors Mc2 and Mc5 are connected to the capacitance Cc2, and both drains of the transistors Mc3 and Mc6 are connected to the capacitance Cc3. These capacitances Cc1 to Cc3 are connected to the third column amplifier 123c in the following stage and serve as an input capacitance of the third column amplifier 123c.

The column amplifier 122 is an inversion amplifier including an operational amplifier OP which is an example of an amplification unit, a feedback capacitance Cf, and a controlling switch Sf, for example, and inverts and amplifies the output signal output from the pixel PX via the vertical signal line 115 for each of the columns.

A constant potential Vref_PGA is supplied to a non-inverting input pin of the operational amplifier OP. An inverting input pin of the operational amplifier OP is connected to an input capacitance of the mixed read controlling unit 121. Further, each of the feedback capacitance Cf and the controlling switch Sf has one end connected to an output pin of the operational amplifier OP and the other end connected to the non-inverting input pin of the operational amplifier OP. Here, reset of the column amplifier 122 is performed by turning on the controlling switch Sf. Further, the output pin of the operational amplifier OP is connected to the sample hold unit 123 in the following stage.

Further, the operational amplifier OP incorporates a standby switch for selectively stopping the operation of the column amplifier 122 for each of the columns. For example, in each of the column amplifiers 122 corresponding to the above described (3 m−2)-th column, a control signal line φSTBY1 is connected to the operational amplifier OP. In each of the column amplifiers 122 corresponding to the above (3 m−1)-th column, a control signal line φSTBY2 is connected to the operational amplifier OP. In each of the column amplifiers 122 corresponding to the above 3 m-th column, a control signal line φSTBY3 is connected to the operational amplifier OP. That is, control signals (standby signals) each defining a standby period are input independently into the column amplifiers 122 for the odd columns neighboring in the row direction D1 by the control signal lines φSTBY1, φSTBY2, and φSTBY3, respectively. Note that a circuit configuration example of the operational amplifier including the standby switch will be described below.

The sample hold unit 123 includes image signal selection switches MS1 and MS2, noise signal selection switches MN1 and MN2, and capacitances CTS and CTD. Here, the switches MS1 and MN1 are CMOS switches, for example.

For example, the image signal selection switch MS1 is turned on while a control signal φSigC is at the high level, and outputs a signal input from the column amplifier 122 to the capacitance CTS. Further, for example, the noise signal selection switch MN1 is turned on while a control signal φDarkC is at the high level, and outputs the signal input from the column amplifier 122 to the capacitance CTD. Here, both of the other ends of the capacitances CTS and CTD are grounded.

In the example of the third embodiment, for suppressing the number of control signal lines, the common control signal lines φSigC and φDarkC are connected to each of the sample hold units 123. Accordingly, in the third embodiment, each of the image signal selection switch MS1 and the noise signal selection switch MN1 in the sample hold unit 123 performs the same operation entirely in the row direction D1.

On the other side, the image signal selection switch MS2 is turned on while a control signal φGH is at the high level, and outputs a voltage retained in the capacitance CTS as an image signal OUTS. Further, the noise signal selection switch MN2 is turned on while the control signal ϕGH is at the high level, and outputs a voltage retained in the capacitance CTD as a noise signal OUTN. Here, the noise signal OUTN is an image signal (dark signal) immediately before the pixel PX is reset by the reset transistor RST and the transfer transistor TX is opened, for example. Accordingly, for example, a fixed noise component and a pixel reset noise component included in the image signal OUTS can be eliminated by means of subtracting the noise signal OUTN from the image signal OUTS.

The horizontal scan circuit 124 turns on the image signal selection switch MS2 and the noise signal selection switch MN2 corresponding to each odd column sequentially in the row direction D1 using the control signal ϕGH, and sequentially outputs the signals OUTS and OUTN retained in the capacitances CTS and CTD, respectively. For example, when each of the image signal OUTS and the noise signal OUTN corresponding to the signal read from the pixel PX in the m-th column is output, the horizontal scan circuit 124 controls the control signal ϕGH(m) to the high level, and controls the control signals ϕGH for the other columns to the low level.

Next, with reference to FIG. 24, there will be explained a circuit configuration example of the operational amplifier OP in the third embodiment. Note that, in FIG. 24, the feedback capacitance Cf and the controlling switch Sf are omitted from illustration. Further, in the example of FIG. 24, "VIN_P" indicates the non-inverting input pin, "VIN_N" indicates the inverting input pin, and "VOUT" indicates the output pin. Further, "STBY" is a standby pin receiving the standby signal (ϕSTBY1-3), and "STBY_N" is a standby pin receiving the negative logic of the above described STBY. Here, in FIG. 24, a part of the sample hold unit 123 is shown together.

Figure 24:
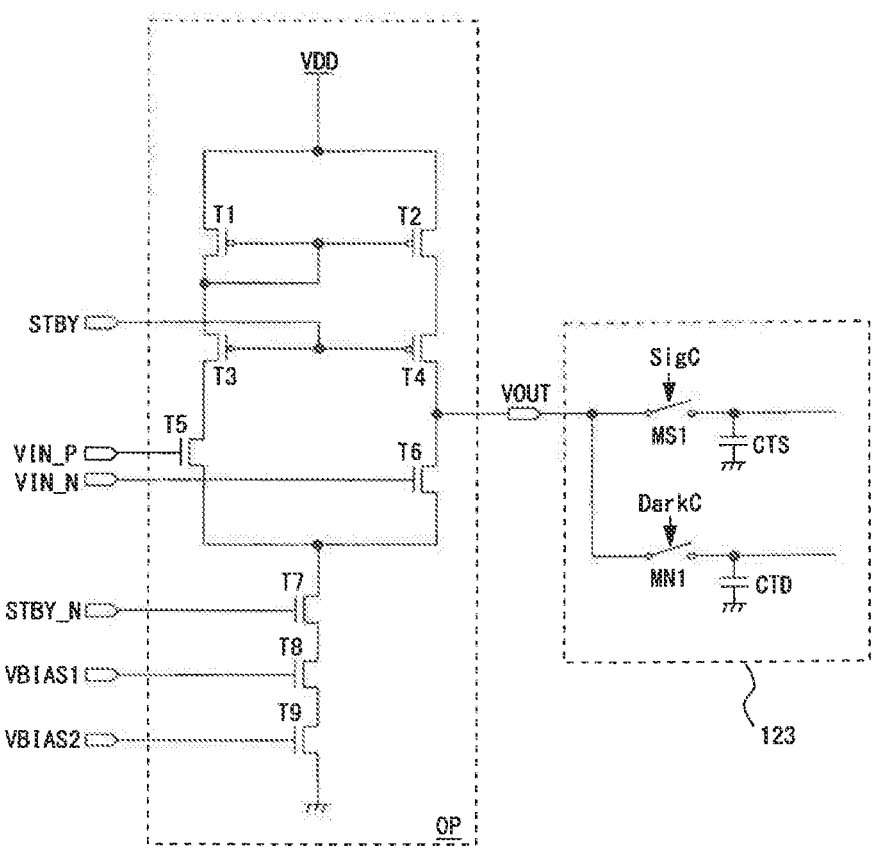
FIG. 24 is a diagram illustrating a circuit configuration example of an operational amplifier OP.

The operational amplifier OP shown in FIG. 24 includes PMOS transistors T1 to T4, and NMOS transistors T5 to T9. In the operational amplifier OP shown in FIG. 24, the PMOS transistors (T3 and T4) and the NMOS transistor (T7) each functioning as a standby switch are added to a typical NMOS input operational amplifier (configured with T1, T2, T5, T6, T8, and T9). Here, the NMOS transistors T8 and T9 configure a cascode type current source.

The transistors T3 and T4 which are the standby switches on the PMOS side are turned off in a standby period (while STBY is at the high level). Both of the above described transistors T3 and T4 receive STBY at the gates. The source of the transistor T3 is connected to the drain of the transistor T1 and the gates of the transistors T1 and T2. The drain of the transistor T3 is connected to the drain of the transistor T5. Further, the source of the transistor T4 is connected to the drain of the transistor T2. The drain of the transistor T4 is connected to the drain of the transistor T6 and the output pin VOUT.

In this manner, the transistor T4 is disposed between the PMOS transistor T2 and the output pin VOUT, and connected to the power supply voltage VDD via the transistor T2. Here, the transistor T3 is provided for keeping symmetry of the circuit. In the configuration of FIG. 24, since the transistors T1 and T2 are connected directly to the power supply voltage VDD, the operational amplifier OP may be scarcely subjected to the influence of IR drop caused by the resistances of the transistors T3 and T4 which are added as the standby switches.

Further, the transistor T7 which is the standby switch on the NMOS side is turned off in a standby period (while STBY_N is at the low level). The above described transistor T7 receives the negative logic (STBY_N) of the STBY at the gate. The drain of the transistor T7 is connected to each of the sources of the transistors T5 and T6 and connected to the output pin VOUT via the transistor T6. The source of the transistor T7 is connected to the drain of the transistor T8, and grounded via the transistors T8 and T9.

In the above described operational amplifier OP, in the standby, the transistors T3 and T4 are turned off, and current from the power supply voltage VDD to the output pin VOUT is cut off. Further, in the standby, the transistor T7 is turned off, and current from the output pin VOUT to GND is cut off. Thereby, the column amplifier 122 enters a standby state. In this standby period, the output pin of the operational amplifier OP enters a floating state. Therefore, in the operational amplifier OP of the third embodiment, even when the sample hold unit 123 of the following stage is operated in the standby period of the column amplifier 122, unnecessary charge is not charged to a capacitance of the sample hold unit 123 from the operational amplifier OP.

On the other side, there will be explained a case in which the standby switches (transistors T3 and T4) do not exist on the PMOS side as a comparative example (illustration of the comparative example will be omitted). In this comparative example, in the standby, the standby switch on the NMOS side is turned off. Thereby, the current from the output pin VOUT to GND is cut off and the column amplifier 122 enters the standby state. However, in the standby period, current flows from the power supply voltage VDD to the output pin side via the PMOS transistor. For example, when the sample hold unit 123 of the following stage is operated in the standby period of the column amplifier 122, in the configuration of the comparative example, the capacitance of the sample hold unit 123 is charged with unnecessary charge, and thus it is found that an ideal standby state is not achieved.

In the following, there will be explained an example of the read operation in the solid state imaging device 111 of the third embodiment.

(Case of the Normal Read Mode)

Figure 25:
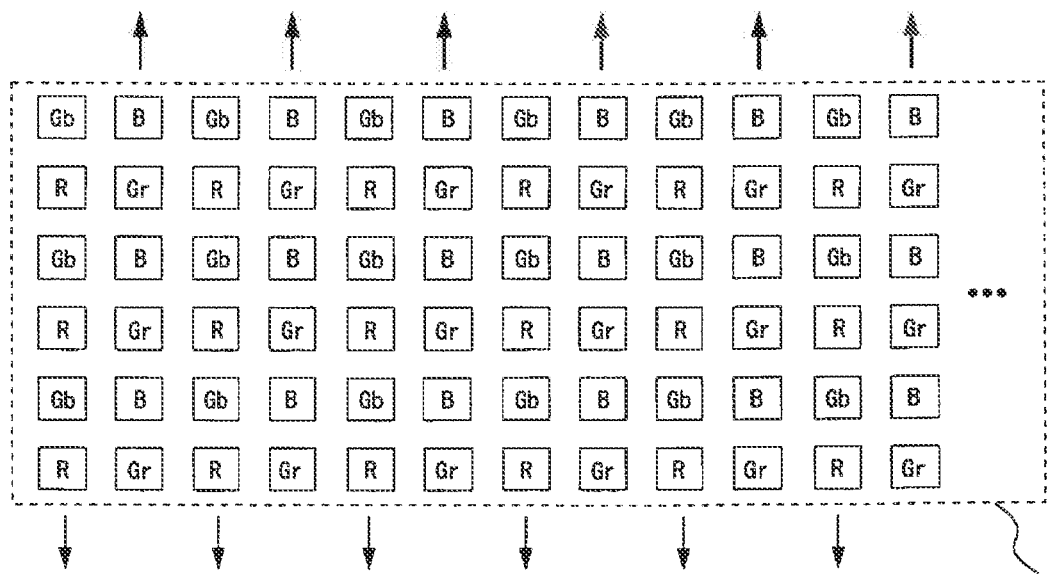
FIG. 25 is a diagram illustrating an example of reading signals from a pixel array in a normal read mode.

FIG. 25 is a diagram showing an example of the signal read from the pixel array 112 in the normal read mode. While the example of FIG. 25 shows the case of reading signals from all the pixels of the pixel array 112, the signal read may be performed by thinning out a row and a column at predetermined intervals.

When the signals are read from the pixels in the odd row of the pixel array 112 in the normal read mode, red pixel (R) signals are read sequentially from the first signal output circuit 116, and, at the same time, green pixel (Gr) signals are read sequentially from the second signal output circuit 117. Further, when the signals are read from the pixels in the even row of the pixel array 112, green pixel (Gb) signals are read sequentially from the first signal output circuit 116, and, at the same time, blue pixel (B) signals are read sequentially from the second signal output circuit 117.

Here, in the normal read mode, the imaging device controlling circuit 118 sets the mode selection signal ϕN to the high level and sets all of the phase selection signals ϕ1, ϕ2, and ϕ3 and the standby signals ϕSTBY1, ϕSTBY2, and ϕSTBY3 to the low level.

Figure 26:
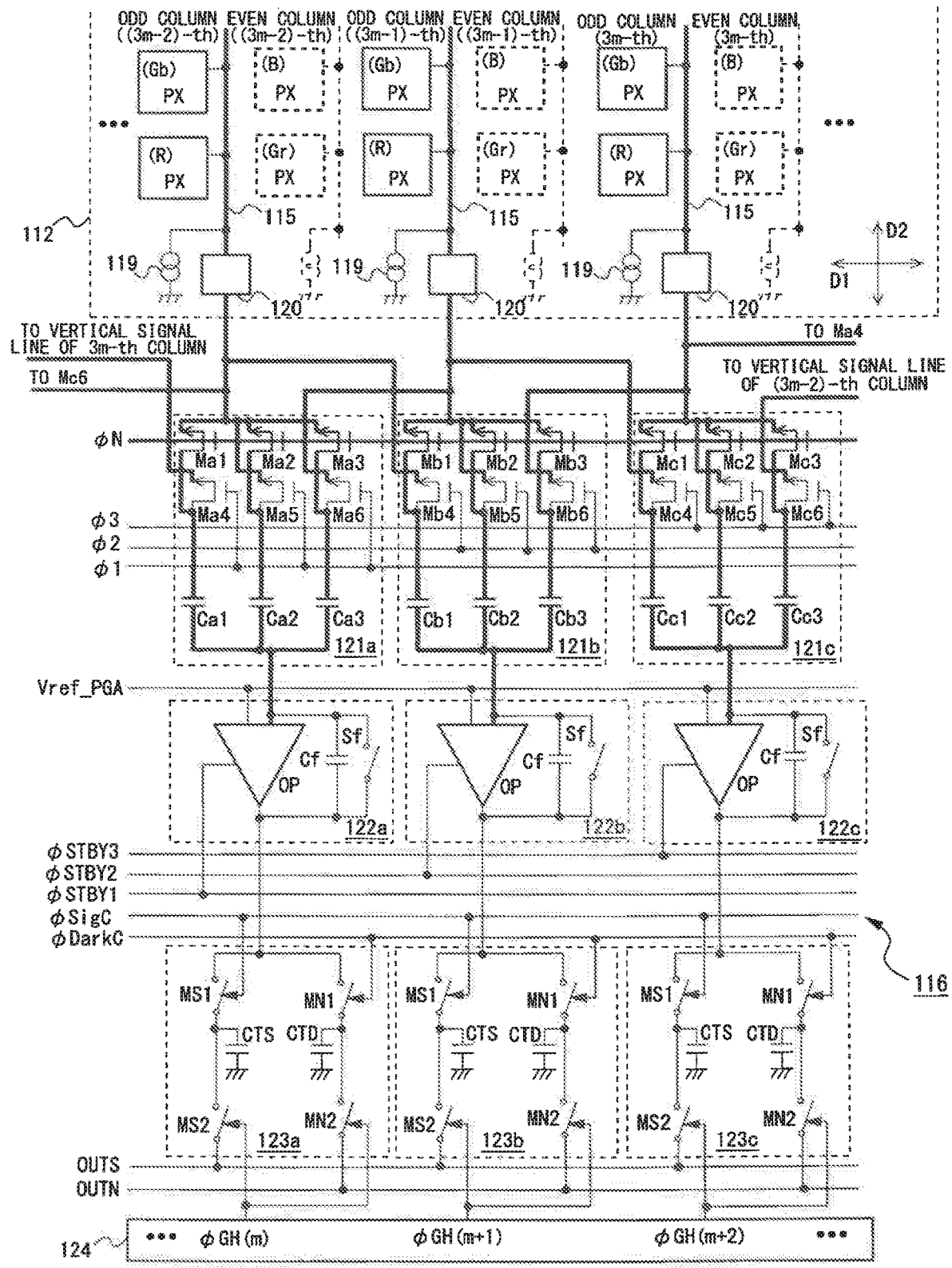
FIG. 26 is a diagram illustrating an operating state of a first signal output circuit in the normal read mode.

Here, there will be explained a case of reading the image signal in the odd column of the pixel array 112. FIG. 26 is a diagram showing an operation state of the first signal output circuit 116 in the normal read mode. Note that, in the following explanation of an operation example, the control signal line exhibiting the high level and a signal line through which the signal from the pixel PX to the operational amplifier OP is output are shown by bold lines in the drawing.

For example, while, in the first mixed read controlling unit 121a corresponding to the above described (3 m−2)-th column, all the transistors Ma1 to Ma3 are turned on, all the transistors Ma4 to Ma6 are turned off. Thereby, when the signal is output from the pixel PX in the (3 m−2)-th column, signal charge thereof is accumulated in the capacitances Ca1 to Ca3 via the transistors Ma1 to Ma3.

Further, since each of the column amplifiers 122 of the odd columns is in an operated state, the output signal read from the pixel PX is inverted and amplified in the column amplifier 122 of the corresponding column, and output to the sample hold unit 123 of the following stage.

Note that, the signal read is also performed as in the above for the other columns ((3 m−1)-th and 3 m-th odd columns) in the first signal output circuit 116 and for each of the columns in the second signal output circuit 117. As described above, the solid state imaging device 111 can read the signal from each of the pixels PX independently in the normal read mode.

(Case of the Mixed Read Mode)

Figure 27:
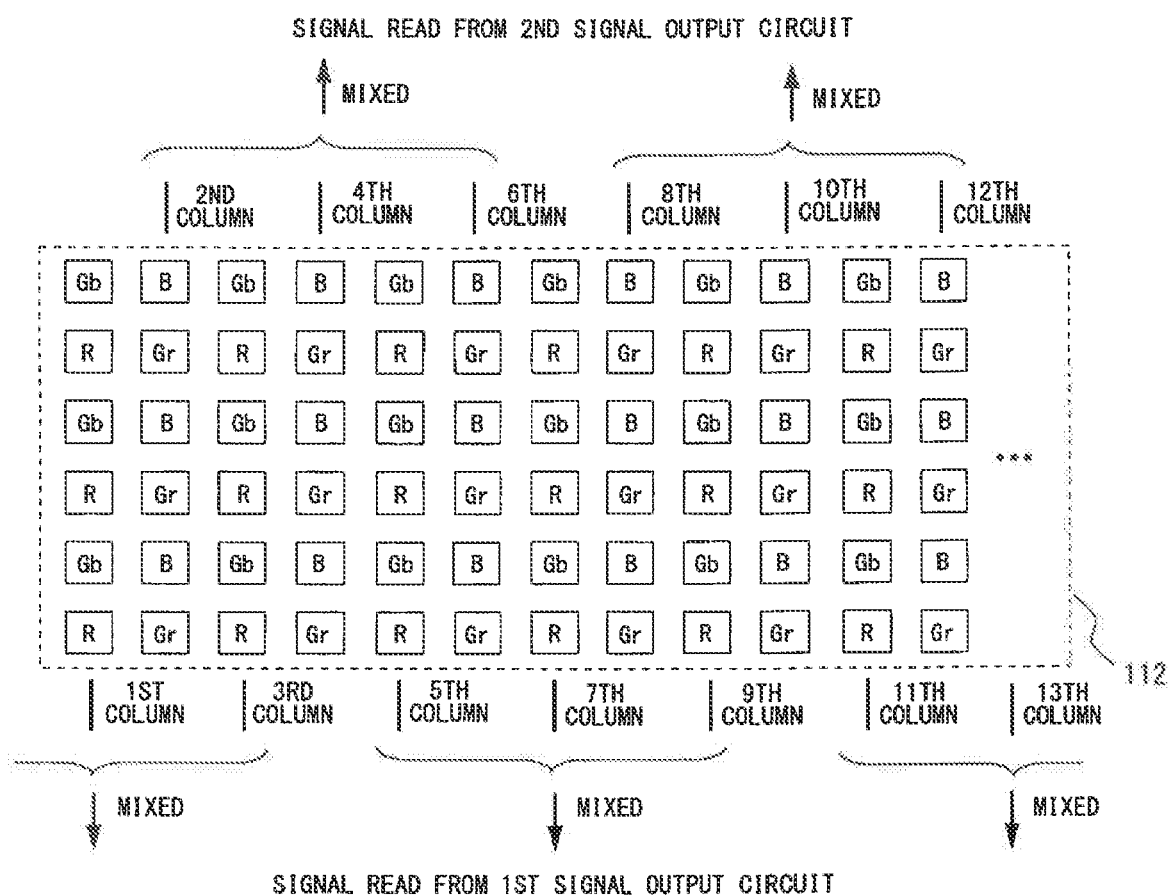
FIG. 27 is a diagram illustrating an example of reading signals from a pixel array in a mixed read mode.

FIG. 27 is a diagram showing an example of the signal read from the pixel array 112 in the mixed read mode. In the mixed read mode, by performing the mixed read of the signals of three pixels having the same color in the row direction D1, it is possible to obtain an image in which noise components are reduced while suppressing generation of moire and false color, in comparison with simple thinning read.

In the above described mixed read mode, a sampling position of the signal is determined so that the position of the center of gravity of each color pixel keeps the Bayer arrangement at the time of mixed read.

In FIG. 27, the signals of the first green pixel (Gb) and red pixel (R) are generated by the mixing of the signals of the 1st and 3rd columns (here, when the green pixel (Gb) and red pixel (R) further exist in the left direction of the first column in the drawing, these signals are also further mixed). Then, the position of the center of gravity of the first green pixel (Gb) and red pixel (R) which are mixed and read exist at the 1st column of the pixel array 112. On the other side, in FIG. 27, the signals of the first blue (B) and green (Gb) are generated by mixing of the signals of the 2nd, 4th, and 6th signals. Then, the position of the center of gravity of the first blue pixel (B) and green pixel (Gb) which are mixed and read exist at the 4th column of the pixel array 112.

For performing the above described read in the mixed read mode, the imaging device controlling circuit 118 sets both of the mode selection signals ϕN of the first signal output circuit 116 and the second signal output circuit 117 to the low level. Further, the imaging device controlling circuit 118 sets all of the phase selection signal ϕ1 and the standby signals ϕSTBY2 and ϕSTBY3 to the high level, and sets all of the phase selection signals ϕ2 and ϕ3 and the standby signal ϕSTBY1 to the low level, for the first signal output circuit 116. On the other side, the imaging device controlling circuit 118 sets all of the phase selection signal ϕ2 and the standby signals ϕSTBY1 and ϕSTBY3 to the high level, and sets all of the phase selection signals ϕ1 and ϕ3 and the standby signal ϕSTBY2 to the low level, for the second signal output circuit 117.

Figure 28:
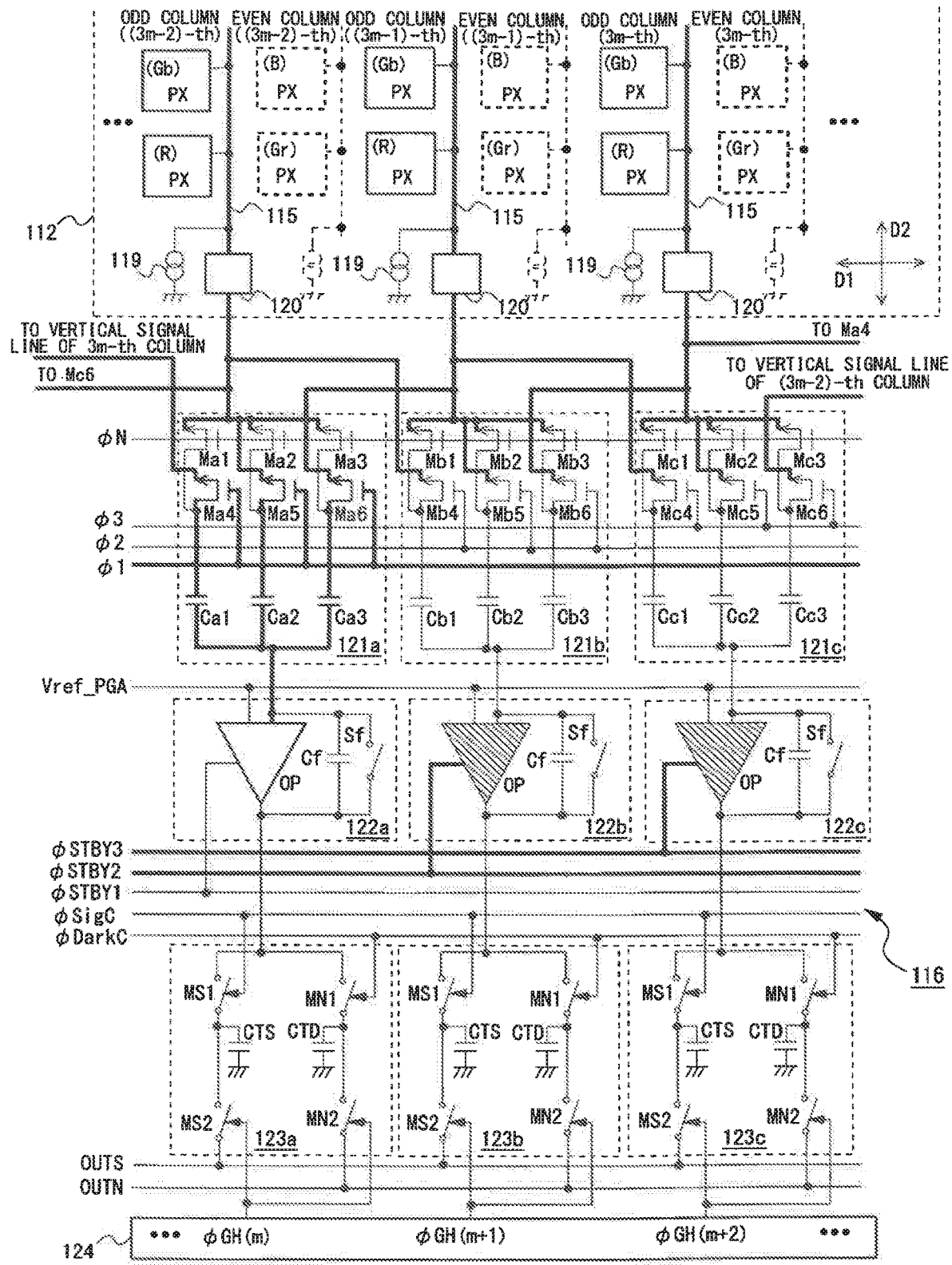
FIG. 28 is a diagram illustrating an operating state of the first signal output circuit in the mixed read mode.

Here, there will be explained the case of reading the image signal of the odd column of the pixel array 112. FIG. 28 is a diagram showing an operation state of the first signal output circuit 116 in the mixed read mode.

In the above described case, since the mode selection signal ϕN is at the low level, all of the transistors Ma1 to Ma3, Mb1 to Mb3, and Mc1 to Mc3 shown in FIG. 28 are turned off.

Further, since the phase selection signal ϕ1 is at the high level, all of the transistors Ma4 to Ma6 are turned on in the first mixed read controlling unit 121a shown in FIG. 28.

Therefore, when the signals are read from the pixels PX of the odd columns in the row direction D1, the signal charge in the vertical signal line 115 corresponding to the (3 m−2)-th column is accumulated in the capacitance Cat via the transistor Ma5. Further, the signal charge in the vertical signal line 115 corresponding to the (3 m−1)-th column is accumulated in the capacitance Ca3 via the transistor Ma6. Further, the signal charge in the vertical signal line 115 corresponding to the 3 m-th column is accumulated in the capacitance Ca1 via the transistor Ma4.

Further, since the standby signal ϕSTBY1 is at the low level, the column amplifier 122 in the following stage of the first mixed read controlling unit 121a is in the operated state. Therefore, the signal charges of the three pixels having the same color in the same row which are accumulated in the capacitances Ca1 to Ca3 are collectively inverted and amplified in the column amplifier 122a, and the mixed read of the output signal is performed.

On the other side, since the phase selection signals ϕ2 and ϕ3 are at the low level, all of the transistors Mb4 to Mb6 and Mc4 to Mc6 shown in FIG. 28 are turned off. Therefore, the signal is not output to the circuit of the following stage from the second mixed read controlling unit 121b and the third mixed read controlling unit 121c. Further, since the standby signals ϕSTBY2 and ϕSTBY3 are at the high level, both of the column amplifier 123b and the column amplifier 123c enter the standby state (in FIG. 28, the column amplifiers 123b and 123c in the standby state are shown with hatching).

Meanwhile, the sample hold units 123 in the third embodiment are operated entirely in the row direction D1 by the common control signals ϕSigC and ϕDark. Therefore, in the mixed read mode, even when the column amplifier 123b and the column amplifier 123c are in the standby state, sometimes the sample hold unit 123 in the following stage is operated. As described above, however, the unnecessary charge is not charged to the capacitance of the sample hold unit 123 in the following stage from the column amplifier 122 of the third embodiment.

Note that, in the second signal output circuit 117 in the mixed read mode, the first mixed read controlling unit 121 and the third mixed read controlling unit 121 enter the standby state, and the above described mixed read is performed in the second mixed read controlling unit 121. The operation of the second signal output circuit 117 in the mixed read mode is almost common to the operation of the first signal output circuit 116 and duplicated explanation thereof will be omitted.

Modified Example 1 of the Third Embodiment

Figure 29:
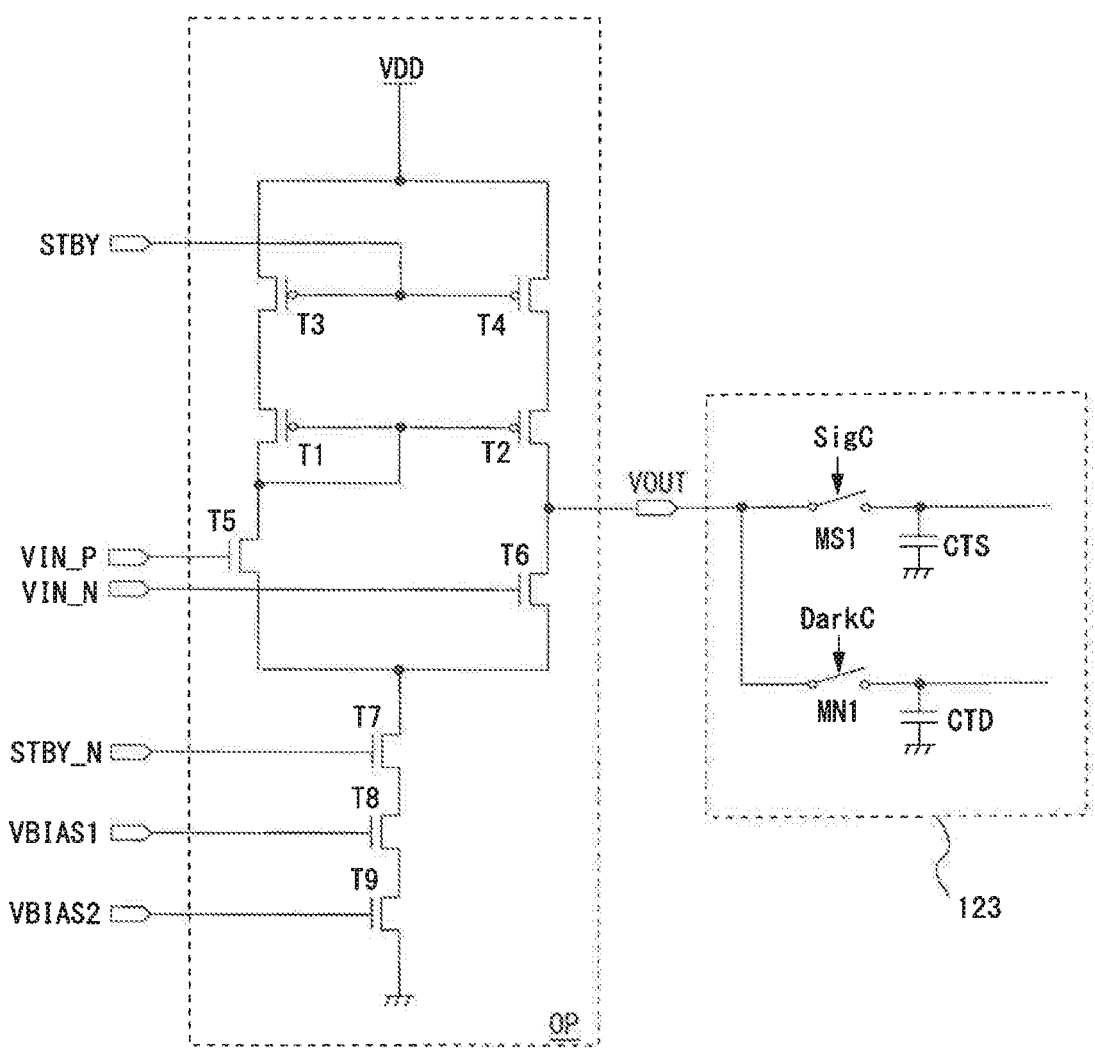
FIG. 29 is a diagram illustrating another example of the circuit configuration example of the operational amplifier OP.

FIG. 29 shows another example of the circuit configuration of the operational amplifier OP in the third embodiment.

The configuration of FIG. 29 shows a modified example of the operational amplifier OP shown in FIG. 24, and is different only in the point that the position of the transistors T1 and T2 and the position of the transistors T3 and T4 are interchanged. Note that duplicated explanation of the elements common to FIG. 24 will be omitted in FIG. 29.

In the example of FIG. 29, the transistor T4 is disposed between the power supply voltage VDD of the operational amplifier OP and the PMOS transistor T2, and connected to the output pin VOUT via the transistor T2. Here, the transistor T3 is provided for keeping symmetry of the circuit.

Also with such a configuration of FIG. 29, it is possible to obtain the same effect as in the above described configuration of FIG. 24. In particular, in the configuration of FIG. 29, the operating points of the transistors T1 and T2 are changed by the influence of the IR drop caused by the resistances in the transistors T3 and T4 which are added as the standby switches. However, the transistors T3 and T4 are connected directly to the power supply voltage VDD in the configuration of FIG. 29, and the transistors T3 and T4 are not a load for the output of the operational amplifier OP. Therefore, it is possible to reduce the stabilization time of the operational amplifier OP by the configuration of FIG. 29, in comparison with the configuration of FIG. 24.

Modified Example 2 of the Third Embodiment

Figure 30:
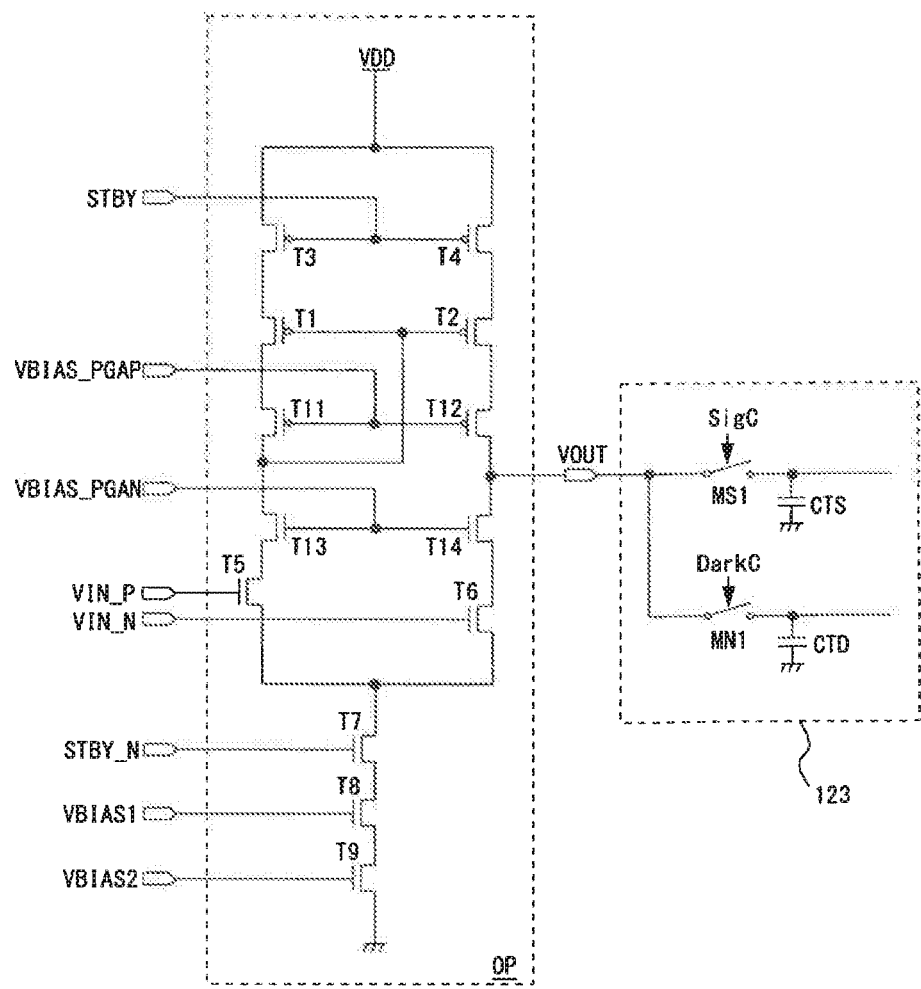
FIG. 30 is a diagram illustrating another example of the circuit configuration example of the operational amplifier OP.

FIG. 30 shows another example of the circuit configuration of the operational amplifier OP in the third embodiment.

The configuration of FIG. 30 is a modified example of the operational amplifier OP shown in FIG. 29, and an example of providing a standby switch for a double-cascode type operational amplifier. In the example of FIG. 30, as in FIG. 29, the transistor T4 is disposed between the power supply voltage VDD of the operational amplifier OP and the PMOS transistor T2, and the transistor T3 is provided for keeping symmetry of the circuit. Note that, in FIG. 30, duplicated explanation of the elements common to FIG. 29 will be omitted.

In the example of FIG. 30, each of a PMOS transistor T11 and a NMOS transistor 13 is connected between the transistor T1 and the transistor T5. Further, each of a PMOS transistor T12 and a NMOS transistor T14 is connected between the transistor T2 and the transistor T6. Here, in the example of FIG. 30, the gates of the transistors T1 and T2 are connected between the drains of the transistors T11 and T13, and the output pin VOUT is connected between the drains of the transistors T12 and T14.

A voltage VBIAS_PGAP is supplied to each gate of the transistors T11 and T12. Further, a voltage VBIAS_PGAN is supplied to each gate of the transistors T13 and T14. In a switched capacitor amplification operation, bias voltages are supplied independently to VBIAS_PGAP and VBIAS_PGAN. Further, in a voltage follower operation, the ground potential is supplied to each gate of the transistors T11 and T12 as VBIAS_PGAP, and the power supply voltage is supplied to each gate of the transistors T13 and T14 as VBIAS_PGAN. Thereby, in the voltage follower operation, the transistors T11 to T14 enter the state equivalent to simple resistances.

Also with such a configuration example of FIG. 30, it is possible to obtain the same effect as in the above described configuration of FIG. 29.

<Configuration Example of the Imaging Apparatus>

Figure 31:
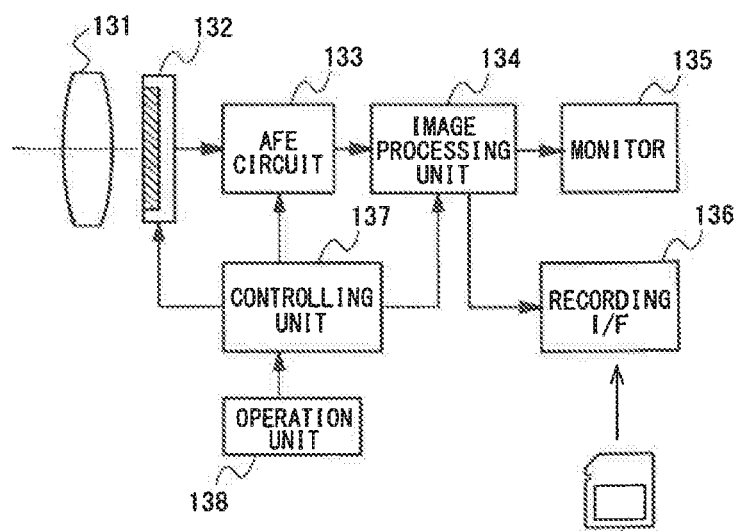
FIG. 31 is a diagram illustrating a configuration example of an imaging apparatus.

FIG. 31 is a diagram showing a configuration example of an electronic camera which is an example of the imaging apparatus.

The electronic camera includes an imaging optical system 131, a solid state imaging device 132 of the above described third embodiment, an analog front end circuit 133 (AFE circuit), an image processing unit 134, a monitor 135, a recording I/F 136, a controlling unit 137, and an operation unit 138. Here, each of the solid state imaging device 132, the analog front end circuit 133, the image processing unit 134, and the operation unit 138 is connected to the controlling unit 137.

The imaging optical system 131 includes a plurality of lenses including a zoom lens and a focusing lens, for example. Note that, for simplicity, the imaging optical system 131 is illustrated as one lens in FIG. 31.

The solid state imaging device 132 captures an object image formed by an optical flux transmitted through the imaging optical system 131. The output of this imaging device is connected to the analog front end circuit 133.

In a photographing mode of the electronic camera, the solid state imaging device 132 captures a recording still image or moving image which is to be recorded in a nonvolatile storage medium (139) in response to an input in the operation unit 138. Further the solid state imaging device 132 captures an observation image (through image) continuously at predetermined intervals also during standby time for capturing the recording still image. Data of the through image (or data of the above described motion image) which is obtained in chronological sequence is used for video display on the monitor 135 and various kinds of operational processing by the controlling unit 137. Note that the electronic camera may record the through image in the video shooting.

The analog front end circuit 133 is a circuit performing analog signal processing and A/D conversion processing sequentially on the image signal input in a pipeline mode. The output of the analog front end circuit 133 is connected to the image processing unit 134.

The image processing unit 134 performs the image processing (color interpolation processing, gradation conversion processing, contour enhancement processing, white balance adjustment, and the like) on a digital image signal input from the analog front end circuit 133. Here, the image processing unit 134 is connected with the monitor 135 and the recording I/F 136.

The monitor 135 is a display device displaying various kinds of image. For example, the monitor 135 performs the video display (view finder display) of the through image in the photographing mode by the control of the controlling unit 137.

The recording I/F 136 has a connector for connecting the nonvolatile storage medium 139. Then, the recording I/F 136 carries out data write/read for the storage medium 139 connected to the connector. The above described storage medium 139 is configured with a hard disk, a memory card incorporating a semiconductor memory, or the like. Note that the memory card is shown as an example of the storage medium 139 in FIG. 31.

The controlling unit 137 is a processor totally controlling the operation of the electronic camera. The operation unit 138 receives an instruction of obtaining the recording still image (e.g., full press operation of a release button) from a user.

<Supplement to the Embodiments>

(Supplement 1): For example, while, in the above described first and second embodiments, each of the amplification units CA1 to CA(m/2) can be switched between the operating state and the operation suspended state, each of the amplification units CA1 to CA(m/2) may not be necessarily switched to the operation suspended state of low power consumption in the present invention.

(Supplement 2): Further, in the solid state imaging device in each of the above described embodiments, the color arrangement of the color filter is the Bayer arrangement. In the present invention, however, the color arrangement of the color filter is not limited to the Bayer arrangement. The present invention can be applied to a solid state imaging device including a color filter of another color arrangement having a repetition period of two rows and two columns (such as a complementary color series color filter using magenta, green, cyan, and yellow, for example) or the like and also a so-called black-and-white solid state imaging device without including a color filter.

(Supplement 3): The above first and second embodiments are examples of the case in which the above described number p is three. In the present invention, however, the above described number p may be two or more. Preferably, the above described number p is an odd number though. This is because, when the above described number p is an odd number, the position of center of gravity of the signal after the addition coincides with the position of center of gravity before the addition and moire or the like is hard to be generated.

(Supplement 4): The above described first and second embodiments explain the configuration in which the solid state imaging device outputs APS and APN as analog signals without change in the horizontal scan circuit. However, the imaging device of the present invention may be a column ADC type in which an AD converter is disposed in each of the amplification units CA, and may provide digital output.

(Supplement 5): The above described third embodiment explains the configuration in which the solid state imaging device outputs OUTS and OUTN as analog signals without change in the horizontal scan circuit. However, the solid state imaging device of the present invention may be a column ADC type in which an AD converter is disposed in each of the column amplifiers 116, and may provide digital output. In this case, instead of the analog front end AFE 133, a digital front end DFE may be disposed in the imaging apparatus.

(Supplement 6): In the above described embodiments, each of the first signal output circuit 116 and the second signal output circuit 117 may be connected with all the vertical signal lines 115. In this case, a column selector may be provided for each of the first signal output circuit 116 and the second signal output circuit 117, and odd column read and even column read may be switched alternately for each of the rows between the first signal output circuit 116 and the second signal output circuit 117. In this case, the signals of the green pixels (Gr and Gb) can be read via the same column amplifier 122, for example, and thereby the level difference between the signals of the green pixels (Gr and Gb) can be reduced.

(Supplement 7): The above described embodiments explain the example in which one pixel is configured with the four transistors. In the solid state imaging device of the present invention, however, the reset transistor RST, the amplification transistor AMP, and the selection transistor SEL may be shared among a plurality of the pixels (e.g., 2.5 Tr configuration having five transistors for two pixels, or 1.75 Tr configuration having seven transistors for four pixels).

Figure 32:
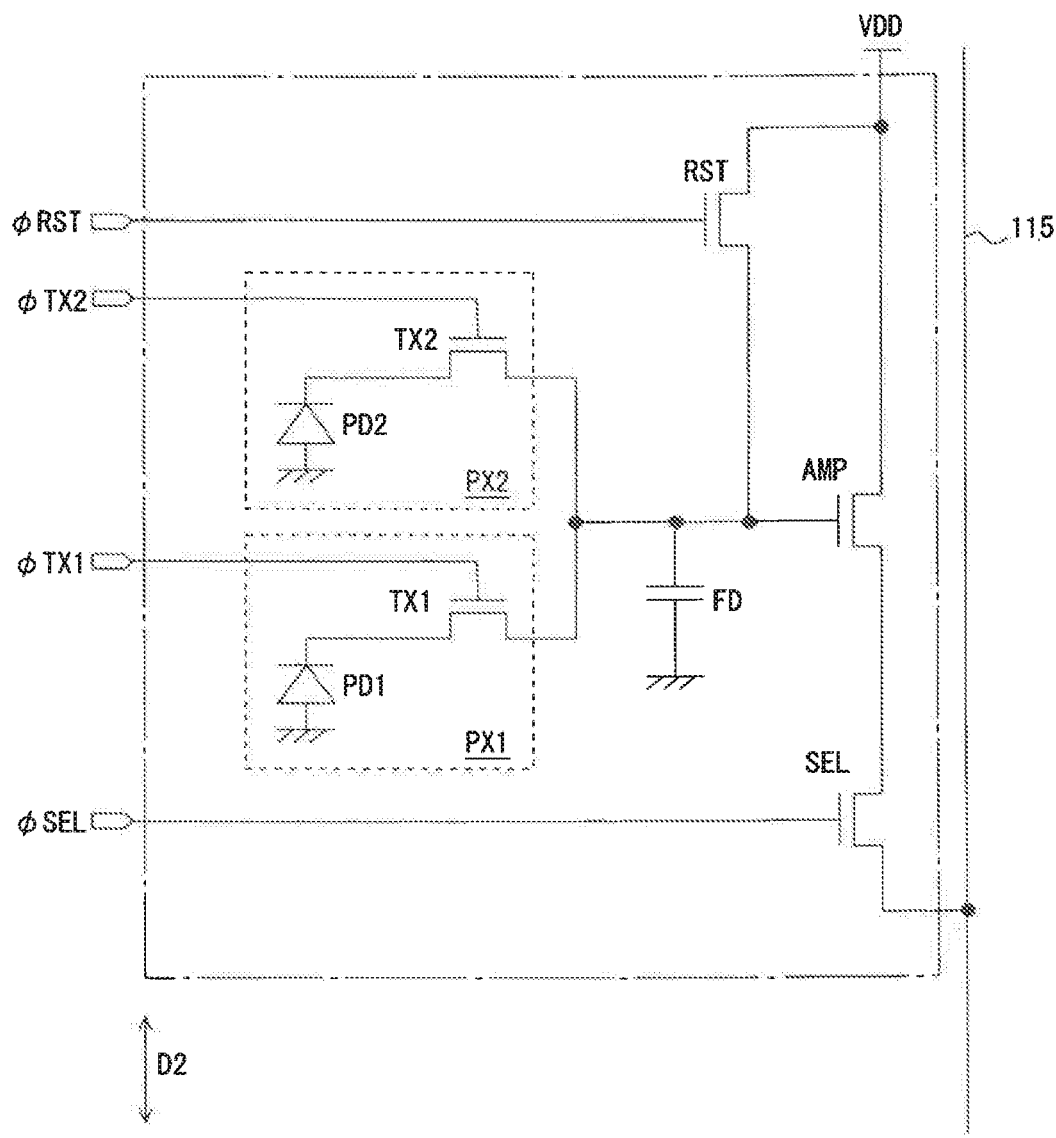
FIG. 32 is a diagram illustrating a modification example of the pixel PX.

FIG. 32 shows a modified example of the pixel PX. The configuration of the pixel PX shown in FIG. 32 is the same as the configuration of the above described pixel PX shown in FIG. 32 except the point that the amplification transistor AMP, the selection transistor SEL, the reset transistor RST, and the floating diffusion FD are shared by the two pixels (PX1 and PX2) neighboring in the column direction D2 of the pixel array. Note that, for the pixel PX shown in the drawing, a plurality of the floating diffusions FD neighboring in the column direction D2 may be connected by a switch, and further the addition read may be made available in the column direction D2 (illustration of this case is omitted).

Figure 33:
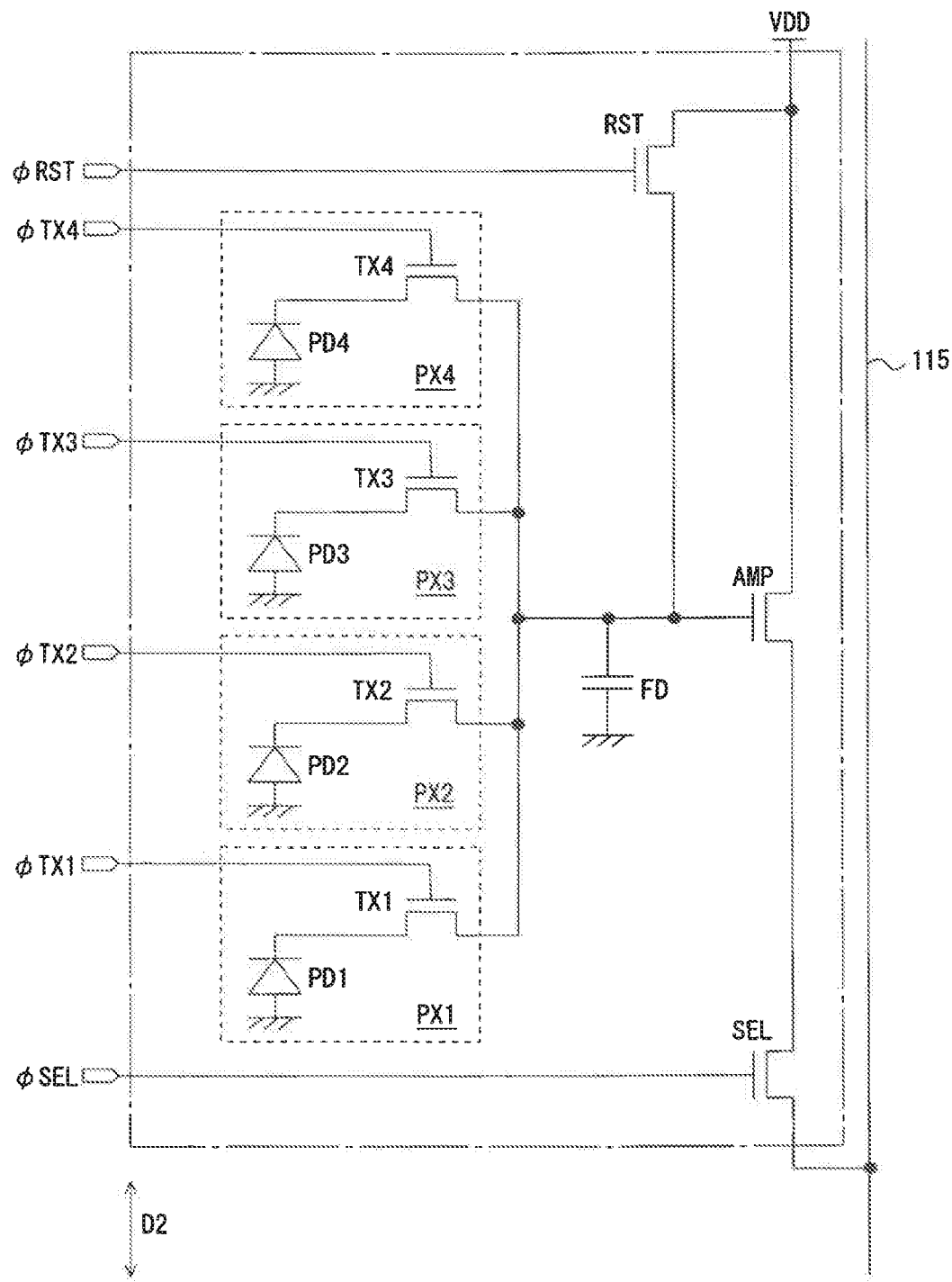
FIG. 33 is a diagram illustrating a modification example of the pixel PX.

FIG. 33 shows another modified example of the pixel PX. The configuration of the pixel PX shown in FIG. 33 is the same as the configuration of the above described pixel PX shown in FIG. 32 except the point that the amplification transistor AMP, the selection transistor SEL, the reset transistor RST, and the floating diffusion FD are shared by the four pixels (PX1 to PX4) neighboring in the column direction D2 of the pixel array.

(Supplement 7): The above described embodiments explain the configuration of the electronic camera as an example of the imaging apparatus. The imaging apparatus of the present invention, however, may integrate the solid state imaging device and the various kinds of signal processing circuit on a chip.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. An imaging device, comprising:
a plurality of pixels;
a first signal line that is connected to a first pixel among the plurality of pixels;
a second signal line that is connected to a second pixel, different from the first pixel, among the plurality of pixels;
a first signal processing unit that includes a first input pin and a first operational amplifier performing signal processing on a signal input to the first input pin;
a second signal processing unit that includes a second input pin and a second operational amplifier performing signal processing on a signal input to the second input pin; and
a controlling unit that switches between (i) a first mode, which connects the first signal line and the second signal line to the first input pin, and (ii) a second mode, which connects the first signal line to the first input pin and connects the second signal line to the second input pin, wherein
the controlling unit controls a power consumption of the second operational amplifier in the first mode to be lower than a power consumption of the second operational amplifier in the second mode.

2. The imaging device according to claim 1, wherein the plurality of pixels are arranged in a row direction.

3. The imaging device according to claim 1, wherein the power consumption of the second operational amplifier when in the first mode is lower than a power consumption of the first operational amplifier when in the first mode.

4. The imaging device according to claim 1, wherein the first signal processing unit, in the first mode, is input from the first input pin a signal output from the first pixel to the first signal line and a signal output from the second pixel to the second signal line.

5. The imaging device according to claim 1, wherein the first pixel and the second pixel each have a color filter including a first spectral characteristic.

6. The imaging device according to claim 1, further comprising
   control lines that are connected to the plurality of pixels and that output a control signal for controlling the plurality of pixels.

7. An imaging apparatus, comprising
   the imaging device according to claim 1.

* * * * *